(12) United States Patent
Totale et al.

(10) Patent No.: US 9,563,450 B1
(45) Date of Patent: Feb. 7, 2017

(54) EXPRESSION BASED HIERARCHICAL MECHANISM FOR HTML FORM DATA VALIDATION

(71) Applicant: EMC Corporation, Hopkinton, MA (US)

(72) Inventors: Sachin G. Totale, Bangalore (IN); Deepak Michael, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/571,117

(22) Filed: Dec. 15, 2014

(51) Int. Cl.
G06F 9/44 (2006.01)
G06F 9/445 (2006.01)

(52) U.S. Cl.
CPC .................. G06F 9/44589 (2013.01)

(58) Field of Classification Search
CPC ....................................... G06F 9/44
USPC .......... 717/104, 117, 120, 126, 132
See application file for complete search history.

(56) References Cited

U.S. PATENT DOCUMENTS

| | | | | |
|---|---|---|---|---|
| 6,681,383 B1* | 1/2004 | Pastor | ................ | G06F 8/30 717/126 |
| 6,868,413 B1* | 3/2005 | Grindrod | ............. | G06N 99/005 706/59 |
| 7,296,297 B2* | 11/2007 | Kirkpatrick | ......... | H04L 67/2819 707/999.007 |
| 7,325,014 B1* | 1/2008 | Kennedy | ............. | G06F 17/3089 |
| 7,577,724 B1* | 8/2009 | Jalagam | ............ | G06F 17/30067 709/220 |
| 2004/0189708 A1* | 9/2004 | Larcheveque | ...... | G06F 17/2247 715/780 |
| 2005/0193329 A1* | 9/2005 | Kickel | ............. | G06F 17/30893 715/237 |
| 2006/0253831 A1* | 11/2006 | Harper | ..................... | G06F 9/54 717/106 |
| 2007/0083853 A1* | 4/2007 | Cook | ........................ | G06F 8/38 717/120 |
| 2007/0192678 A1* | 8/2007 | Tang | ..................... | G06F 17/243 715/234 |
| 2008/0250313 A1* | 10/2008 | Kamdar | ............... | G06F 9/4443 715/700 |

(Continued)

OTHER PUBLICATIONS

Weinhardt "Extending Windows Form with a custon validation component library, Part 3", Jun. 8, 2004, <http://msdn.microsoft.com/en-us/library/ms951078 (printer).aspx> [retrieved online], [retrieved on Oct. 10, 2015].*

(Continued)

*Primary Examiner* — Chat Do
*Assistant Examiner* — Jae Jeon
(74) *Attorney, Agent, or Firm* — Van Pelt, Yi & James LLP

(57) ABSTRACT

Expression-based hierarchical validation is disclosed, including: receiving an indication to configure validation for an application page element; in response to the indication, causing to be displayed a validation configuration user interface to receive validation configuration for the application page element; receiving validation configuration for the application page element that includes a validation expression provided via the validation configuration user interface; and generating, based at least in part on the validation expression, code to be executed at a runtime to validate runtime data associated with an instance of the page element.

14 Claims, 13 Drawing Sheets

(56) References Cited

U.S. PATENT DOCUMENTS

2013/0218758 A1* 8/2013 Koenigsbrueck ...... G06Q 40/02
705/39

OTHER PUBLICATIONS

Weinhardt "Extending windows forms with a custon validation component library, Part 1", Mar. 16, 2004, <http://msdn.microsoft.com/en-us/library/ms950965 (pronter).aspx> [retrieved online], [retrieved Oct. 10, 2015].*

NPL, "Tripwire Magazine", Jun. 18, 2013, <www.tripwiremagazine.com/2009/11/truly-useful-form-validation-scripts-for-front-end-development.html> [retrieved online], [retrieved Oct. 10, 2015].*

Weinhardt ("Extending Windows Forms with a Custom Validation component Library, Part 3"), Jun. 8, 2004.*

\* cited by examiner

US 9,563,450 B1

EXPRESSION BASED HIERARCHICAL MECHANISM FOR HTML FORM DATA VALIDATION

BACKGROUND OF THE TECHNOLOGY

Typically, when developing an application in a development environment, specialized code is written to perform the validation for a particular form field. However, this presents a challenge to development tool users who have limited or no programming knowledge, making it difficult for them to configure validation for fields in an application that they are designing.

BRIEF DESCRIPTION OF THE DRAWINGS

Various embodiments of the technology are disclosed in the following detailed description and the accompanying drawings.

DETAILED DESCRIPTION

Figure 1:
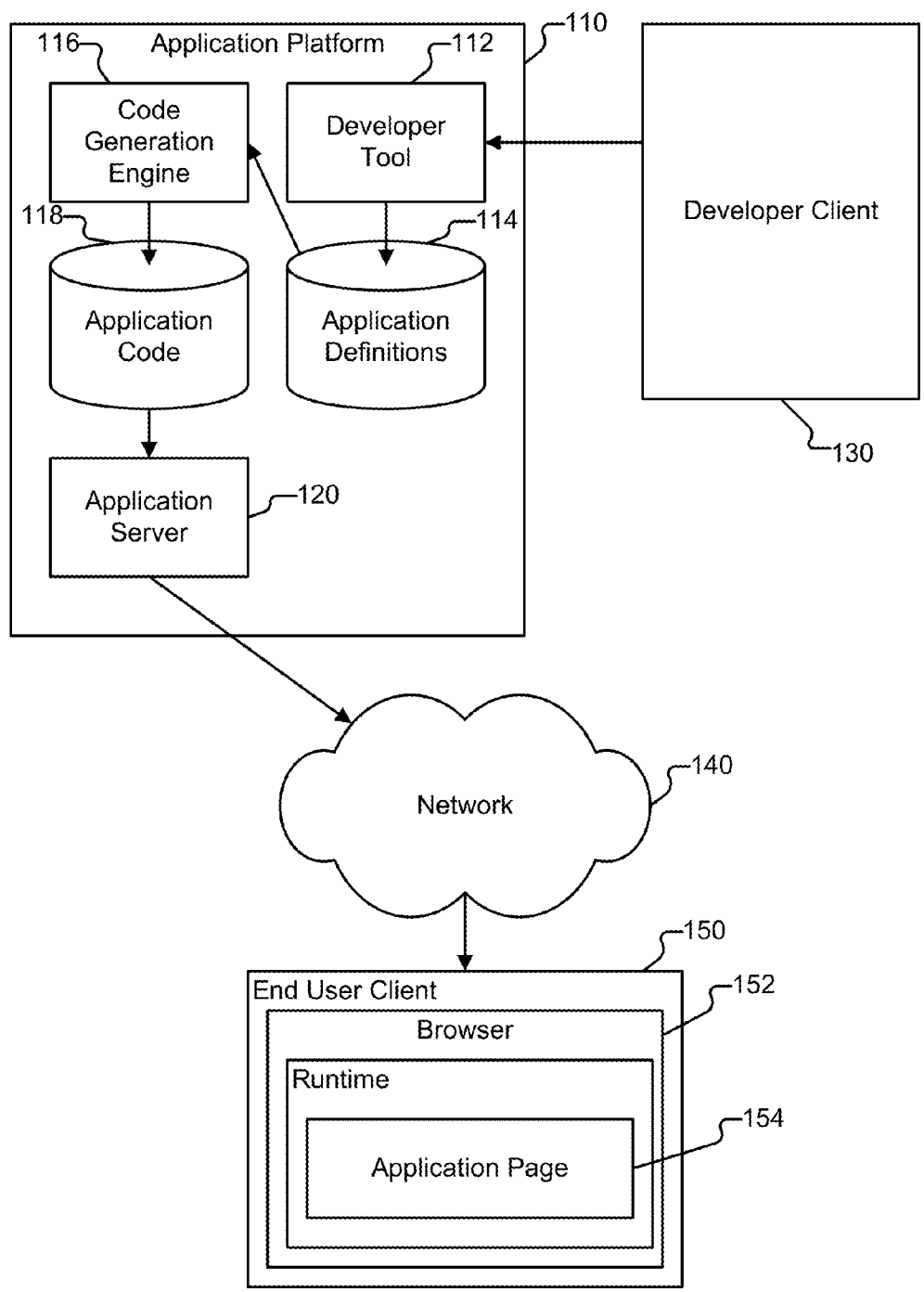
FIG. 1 is a block diagram illustrating an example embodiment of an environment in which an expression-based hierarchical mechanism for data validation is provided.

The technology can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the technology may take, may be referred to as techniques. In general, the order of the steps of disclosed processes may be altered within the scope of the technology. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the technology is provided below along with accompanying figures that illustrate the principles of the technology. The technology is described in connection with such embodiments, but the technology is not limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of example and the technology may be practiced according to the claims without some or all of these specific details. For the purpose of clarity, technical material that is known in the technical fields related to the technology has not been described in detail so that the technology is not unnecessarily obscured.

An expression-based hierarchical mechanism for HTML form data validation is disclosed. In various embodiments, each of a plurality of nodes in an application page hierarchy may have a validation status that is dependent on the validation status of child nodes in the page hierarchy. In various embodiments, a node in a hierarchy may include a single application page element or a logical container that includes a grouping of one or more application page elements and/or one or more other containers. As will be described herein, the validation properties of the nodes in the page hierarchy may be configured using expressions that are specified through a composer graphical user interface (e.g., using an expression properties editor as described in further detail below). In some embodiments, the validation properties included expression-based validation rules that determine the validation status of an element or container of elements. As will be described in more detail below, validation status of an element and/or container may be propagated to parent nodes in the page hierarchy. The validation statuses of elements and/or containers may also be consumed by other elements and/or containers by parent nodes of the hierarchy. In some embodiments, the behavior of actions and/or operations is configured to be controlled based on the validation statuses of elements and/or containers to which an action and/or operation's behavior is bound.

In various embodiments, the expression-based hierarchical mechanisms/implementations described below can provide various benefits, including that complex validation can be performed on specific elements or containers, dynamic user interface (UI) composition is enhanced, and that a hierarchical runtime framework can be implemented at the client side. As another example benefit, dynamic validation chaining can be composed without requiring the need to write any specialized code to perform validation. Additionally, code changes are not required to adjust to new business requirements. Another example benefit provided via expression-based hierarchical validation is the ability to associate validation at any level in an application page hierarchy.

Embodiments of expression-based hierarchical mechanisms for HTML form data validation are disclosed herein. In various embodiments, an application (e.g., developed by a user associated with an enterprise) is defined, built, and deployed. The application may be defined using a developer tool that is configured to provide a user with predefined patterns, components, and services, for example, that the user may use to define the application and/or the deployment thereof. In various embodiments, a page to be used in the application is defined. In some embodiments, the page comprises a form (e.g., HyperText Markup Language (HTML) form). The page is defined to include one or more elements. In various embodiments, an "element" comprises an input field, a selection, a widget, a button and/or an action.

As will be described in further detail below, in some embodiments, an expression-based hierarchical mechanism for HTML form data validation facilitates data validation configuration (e.g., via developer tool) of any element (and at any level) in a page hierarchy, and enables a validation infrastructure that facilitates propagation of validation results to parent nodes in a hierarchical manner. For example, as will be described in more detail below, elements in a page can be grouped into parent containers (which can in turn be grouped into higher level containers), establishing a page hierarchy. In addition to configuring validation for an individual element, validation for a parent container can be configured. In some embodiments, validation configuration of a container is based on the validation results of the elements grouped within the parent container, forming a hierarchical validation relationship, in which validation results are propagated to parent nodes in a hierarchical manner.

As will be described in further detail below, using embodiments of the hierarchical validation mechanism described herein, a composer/designer of an application can configure validation expressions at any individual element/container level. The outcomes of validation performed at runtime can then be configured to be consumed from any element/container level in a configured hierarchy. Additionally, the validation outcomes can be used to control the behavior of elements/actions across a page in an application. As will be described in further detail below, the capability to express data validation at any level in a page hierarchy allows an application composer, in various embodiments, to reuse validation logic, configure validation chaining, configure conditional validation, configure validation for groups of fields (e.g., elements grouped into a parent container), configure actionable elements/flows across a page (e.g., whose behavior is configured to be controlled based on the validation results of elements/containers), etc.

As will be described in further detail below, using the hierarchical validation mechanism described herein, an expression-based infrastructure is provided that can be used by an application designer to define validation expressions on an element or container.

In some embodiments, the validation configuration for the element is stored as part of the definition of the application. In various embodiments, application code is generated for the application defined in the developer tool. In various embodiments, when the application code is generated, runtime validation code is generated based on the validation expressions that were previously configured with respect to elements/containers by a composer. The runtime validation code is then used to validate runtime data associated with corresponding elements/containers. Results of runtime validation can in turn be used to control the runtime behavior of other elements, as previously configured using the developer tool.

FIG. 1 is a block diagram illustrating an example embodiment of an environment in which an expression-based hierarchical mechanism for data validation is provided. Application platform 110 is configured to enable a developer user to define an application (e.g., via a composition interface), generate application code for the defined application, and deploy the application for an end user to use (e.g., using a web browser). Application platform 110 includes developer tool 112, application definitions 114, code generation engine 116, application code 118, and application server 120.

As shown in the example, developer client 130 is connected to application platform 110. While not shown in the example, application platform 110 may be connected to developer client 130 via network 140 (e.g., the Internet). In various embodiments, developer tool 112 is configured to enable a developer user (e.g., associated with an enterprise) using developer client 130 to create an (e.g., enterprise) application. For example, developer client 130 comprises a computer, mobile device, or any other computing device with a user interface. Examples of an enterprise application include an insurance claim processing application, a loan application processing application, and a credit dispute resolution application. Portions of an enterprise application may be used by users internal to the enterprise (e.g., employees of the enterprise) and portions of the enterprise application may be used by users external to the enterprise (e.g., customers of the enterprise). For example, a customer of an insurance company may use the insurance claim processing application to submit a new claim and then an employee (e.g., customer representative or claims adjustor) of the insurance company may use the application to review the content of the claim against the policy taken out by the customer. In some embodiments, developer tool 112 provides (e.g., a web-based) graphical composition tool at a user interface of developer client 130 that enables a developer user to compose/define an application using predefined patterns, components, services, templates, libraries, and rules, for example. For example, a definition of an application may comprise a data model. A definition of an application may include selections of predefined content, defined relationships between different components, values submitted to correspond to selected attributes, a user interface, a form, a menu, an integration to a third party service, a login page, and a search feature, for example.

As will be described in further detail below, a definition of an application may also include the data validation configuration with respect to each of at least some elements of a page of the application. In some embodiments, if elements in the page are organized in a page hierarchy, for example, where a subset of elements have been grouped into a parent container, the data validation configured with respect to parent containers is also included in the definition of the application. In some embodiments, an application is defined to include one or more pages in which an end user of the application may input information. For example, a page may include a form with one or more elements in which information may be inputted or selected. A developer user may use the graphical composition tool of developer tool 112 to configure validation of runtime data with respect to an element (e.g., data capture widget/element) of a page of an application. For example, using the graphical composition tool, the developer user can enter/write a validation expression with respect to the element. In some embodiments, the developer user can use the graphical composition tool to group elements into a container. A validation expression with respect to the container can then be defined either by the user, or automatically, based on the validation configuration of the contained elements. In some embodiments, expressions are defined/specified using an expression properties editor, as will be described in further detail below. In some embodiments, the developer user can also configure the behaviors of page elements based on the validation results of other page elements/containers. As will be described in more detail below, the behavior of an action can be bound to multiple elements that are explicitly specified, to one or more containers of elements (e.g., without having to specify the elements in the containers explicitly), etc. In some embodiments, the graphical composition tool of developer tool 112 allows a user to drag and drop predefined content at the user interface to enable a developer user with little to no computer programming experience to define an application. An example of the graphical tool is the EMC Documentum xCP software. Developer tool 112 is configured to store the definition of each application at application definitions 114 of application platform 110. For example, application definitions 114 comprises a storage or database for definitions of applications.

Code generation engine 116 of application platform 110 is configured to obtain a definition of an application from application definitions 114 and generate application code based on the definition. Code generation engine 116 then stores the generated application code corresponding to an application at application code 118 of an application platform 110. For example, application code 118 comprises a storage or database for application code.

As shown in the example, application platform 110 is connected to end user client 150 over network 140. Application server 120 of application platform 110 is configured to deploy application code associated with an application from application code 118 for an end user of the application using end user client 150. As shown in the example, the application may be a web-based application that can be executed for the end user of end user client 150 in a runtime environment associated with browser 152. The end user using end user client 150 is able to view application page 154 in an instance of the application in browser 152. Application page 154 may include one or more elements into which an end user of end user client 150 can input information. For example, application page 154 is rendered using hypertext markup language (HTML) and includes a form with one or more elements. For example, application page 154 comprises a page of a loan application that is being completed by an end user who wishes to apply for a loan. In some embodiments, for each element of application page 154 for which the developer user has configured validation during the definition (e.g., design time) of the application, runtime data associated with the element (e.g., data inputted by the data into a form field) is validated according to the configured runtime validation. In some embodiments, the validation of parent containers is also performed based on the validity states of elements that have been grouped into the parent container. This can include, for example, propagating any validity state change events through the different levels/parent nodes of an established page hierarchy. For example, the parent container is configured to listen for and consume the validity state change of the events of the elements grouped into the parent container, which are used in turn to determine the validity state of the parent container.

In some embodiments, the behaviors/actions of other elements in a page are determined/triggered based on the validity state of child elements. For example, an element's behavior can be bound to the validity state of one or more elements and/or a logical container.

In the example environment, components 112-120 are shown to be included in a single application platform 110. Application platform 110 can also be implemented using a scalable, elastic architecture and may comprise several distributed components, including components provided by one or more third parties. Further, when application platform 110 is referred to herein as performing a task, such as storing data or processing data, it is to be understood that a sub-component or multiple sub-components of application platform 110 (whether individually or in cooperation with third party components) may cooperate to perform that task.

Figure 2:
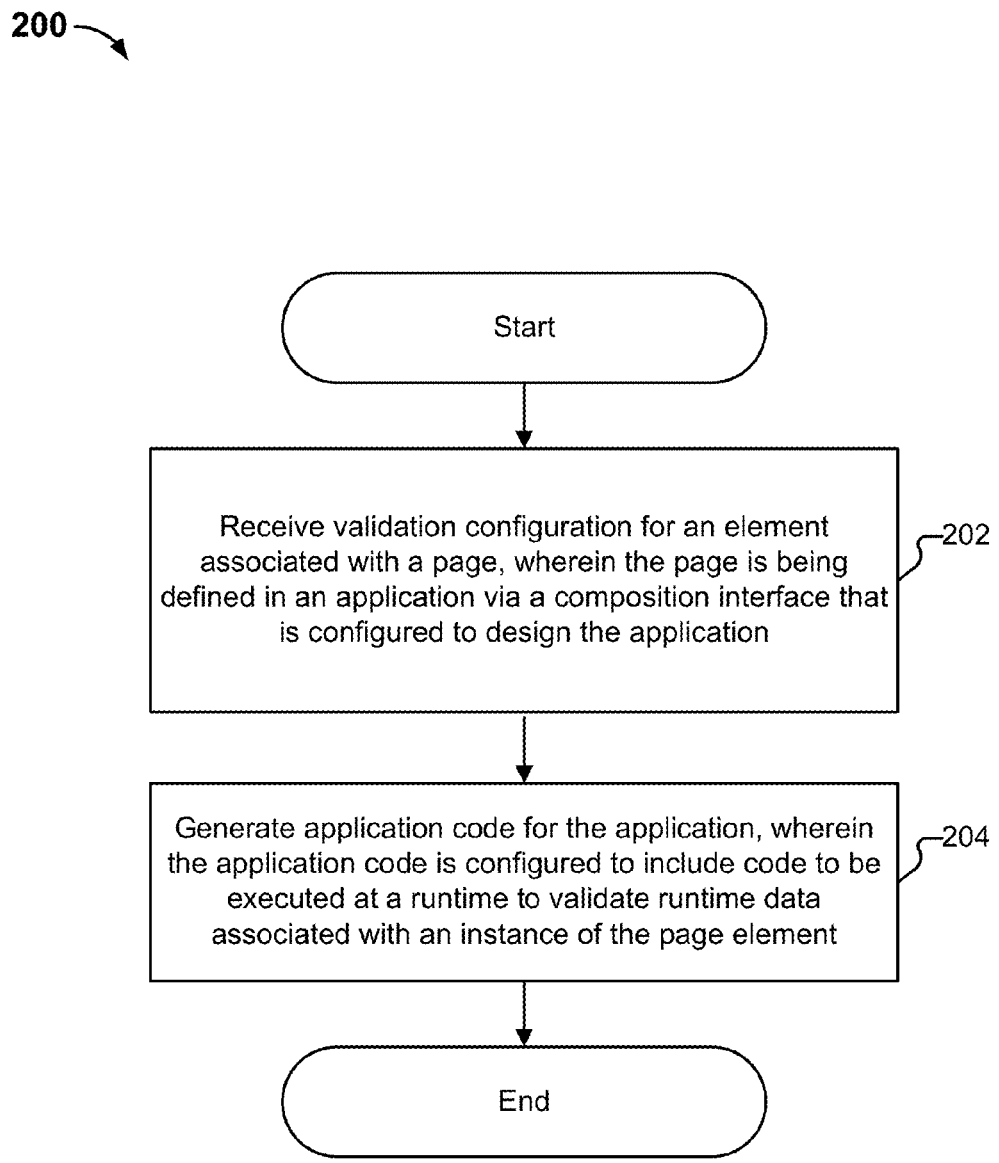
FIG. 2 is a flow chart illustrating an example embodiment of a process to configure expression-based hierarchical data validation.

FIG. 2 is a flow chart illustrating an example embodiment of a process to configure expression-based hierarchical data validation. In various embodiments, application platform 110 of FIG. 1 may be configured to implement process 200 of FIG. 2.

At 202, validation configuration for an element (or a container) associated with a page is received, wherein the page is being defined in an application via a composition interface that is configured to design the application. In various embodiments, a composition interface associated with a developer tool is presented to a developer user to define an application during design time. For example, the composition interface comprises a graphical composition interface in which the developer user may drag and drop and/or otherwise add predefined content (e.g., widgets) at the user interface to define the application. Validation configuration with respect to each of one or more elements can be performed by the developer user at the composition interface. In some embodiments, validation can be configured at a container level of the application page. For example, the container may include multiple page elements (and/or one or more containers) with which the group/container validation can be configured. In some embodiments, binding of actions/behaviors to the validity properties of elements or containers can also be configured by the developer user at the composition interface.

At 204, application code is generated for the application, wherein the application code is configured to perform validation of runtime data with respect to elements on the page based on the previously specified validation configuration. The definition associated with the application is stored and used to generate application code for the application. The application is executed to run an instance of the application for an end user at runtime. The application code is configured to present a page such that for each element for which validation is configured, validation is performed for runtime data associated with the element. Additionally, if elements in the page have been organized hierarchically (e.g., where elements have been grouped into parent containers, which in turn may be grouped into higher level containers) the application code is configured to propagate validity state changes to parent nodes in a page hierarchy, which are listened to and consumed by the parent nodes, which in turn perform validation processing according to their previously defined configuration. For example, the behavior of an element can be determined based on the validity state of the elements and/or containers to which the element is bound. In some embodiments, various messages can be displayed to the end user based on the validation performed. For example, if a last name field was left empty (e.g., by checking whether the input is "null"), resulting in the field being invalid, a message can be displayed to the end user with the message "this field cannot be left empty."

Figure 3:
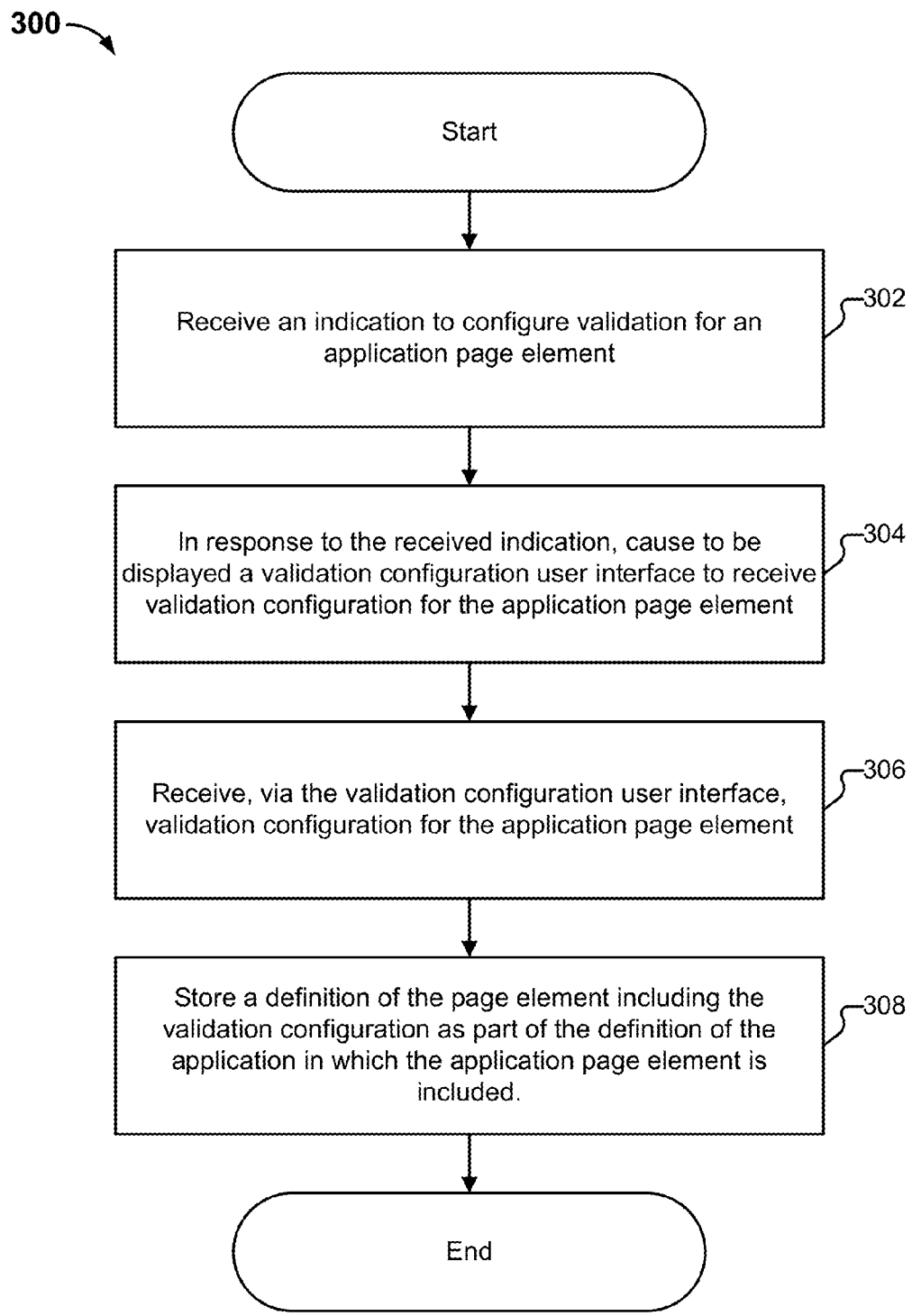
FIG. 3 is a flow chart illustrating an example embodiment of a process and system to configure validation for an application page element.

FIG. 3 is a flow chart illustrating an example embodiment of a process and system to configure validation for an application page element. In some embodiments, the process of FIG. 3 may be implemented by an application platform (e.g., application platform 110 of FIG. 1) and/or a component thereof, such as developer tool 112 of application platform 110 of FIG. 1. In some embodiments, process 300 is used to implement process step 202 of FIG. 2.

Process 300 describes an example process for configuring validation of an application page element during design time.

The process begins at 302, when an indication to configure validation for an application page element is received. For example, suppose that a developer user has included in a loan application page, a form field for soliciting an end-user's social security number (SSN). While in the context of designing the page via an application graphical composition user interface, the developer uses a mouse to select the SSN field (that the developer user has added to the layout of the page being designed) in order to configure the page element's properties. In some embodiments, in response to the selection, a properties panel is displayed, presenting to the developer user various tabs corresponding to the types of properties that can be configured for the form field (where different types of properties may be available for different types of page elements). As one example, the developer user indicates that they would like to configure validation properties of the application page element by selecting the "validation" tab of the properties panel. In various embodiments, application page elements include form fields, text input widgets, date of birth fields, data capture fields, etc.

At 304, in response to the indication to configure validation for the application page element, a validation configuration user interface to receive validation configuration for the application page element is caused to be displayed. For example, in response to the developer user selecting the "validation" table of the properties panel for the selected application page element, a validation configuration panel is displayed to the developer user in the composition graphical user interface.

At 306, validation configuration for the application page element is received via the validation configuration user interface. In some embodiments, validation configuration includes configuration of validation properties associated with the application page element. One example validation property that can be configured in various embodiments is a property for indicating whether the application page element is mandatory. For example, suppose that the developer would like to configure whether the SSN field is a mandatory field (i.e., an end-user is required to provide their social security number). A field can be presented in the validation configuration panel for specifying whether the SSN form field is mandatory. For example, the validation configuration panel can include a prompt "is mandatory?" with an input field where, for example, the developer user can enter the Boolean value "true" if the field is mandatory, or "false" if the field is not mandatory. Other types of user interface fields can be presented to the user for specifying whether the element being configured is mandatory. For example, a radio button can be presented via the validation panel, with a selection of the radio button indicating that the element is mandatory, while the element is not mandatory if the radio button is not selected. In some embodiments, if the element is indicated to be mandatory, a preview of the page element is updated to display an accompanying asterisk indicating the element's mandatory status (which will also be displayed at runtime to an end-user).

Another example of a validation property that can be configured is validation rules for determining the validation status of the element, which can include "valid" or "invalid." In some embodiments, if a developer user wishes to add a validation rule to the element, a panel to receive configuration of a validation rule is presented to the user.

In some embodiments, configuring a validation rule includes specifying a validation expression that is used to determine the validity of the application page element. For example, suppose that a user would like to specify a validation rule that checks whether an input to the SSN input field is 9 characters long. The developer user can enter, into a field in a validation rule configuration panel, a logical, mathematical expression such as "get(input.length)==9." In this example, at runtime, according to the expression, the length of the end-user's input into the SSN field will be retrieved (for example, the text input field may have a "length" attribute that is exposed and can be retrieved), and compared to the value "9" as specified in the expression. If the length is equal to 9, then the SSN field is determined to be valid with respect to the length validation rule expression (e.g., the expression results in a value of "true," indicating that the input is valid). If the length of the input is not equal to 9, then the SSN field is determined to be invalid. Various types of syntax can be implemented for expressing validation rules. In some embodiments, expressions are defined using an expression properties editor, which will be described in more detail below and in conjunction with FIGS. 12 and 13.

In some embodiments, configuring a validation rule includes configuring a condition that triggers, at runtime, the execution of the validation expression. One example is an input change event. For example, any time it is determined that an input has been entered into the SSN form field at runtime, an input change event can be fired, triggering the evaluation of the input according to the specified validation expression.

In some embodiments, configuring a validation rule includes configuring an error message to be provided if the application page element is determined, based on an evaluation of runtime data associated with the application page element according to the validation expression, to be invalid. For example, for the validation rule that checks whether the input to the SSN is the proper length, the error message "the SSN must be 9 digits" can be specified by the developer user to be displayed if, at runtime, the input entered into the SSN form field is determined to not be 9 digits.

Multiple validation rules can be configured for a page element, allowing the element's validation status to be determined either as valid or invalid based on various criteria and dimensions, as expressed via the validation expressions. For example, another validation rule could be configured for the SSN field that checks/validates that the input to the SSN field is composed only of numeric digits. The developer user can specify an expression that checks whether input provided by an end-user contains only numeric digits (e.g., that the input cannot be a string or include special characters such as "#," "@," "$," etc.). The developer user can also configure evaluation of the input value according to the expression be performed whenever a change event condition occurs. The developer user can also configure an error message "the SSN must be only numeric digits" or that "illegal characters have been inputted" if the input is determined to be invalid according to the validation expression.

At 308, a definition of the page element including the validation configuration is stored as part of the definition of the application in which the application page element is included (e.g., where the application is stored to application definitions data store 114 of FIG. 1). As described above, application code for the application will be generated based on the definition of the application, including code to be executed at a runtime to validate runtime data associated with an instance of the application page element. In some embodiments, the process continues to process step 204 of FIG. 2, where such application code is generated (e.g., based on the definition stored at 308).

As will be described in further detail below, in some embodiments, the behavior of actionable elements can be configured to be controlled/dependent upon the validation status of application page elements. For example, suppose that, along with the SSN form field, the developer user includes in the page a "save" button element. The user can configure, through the specification of an expression involving the validation status of the SSN form field, that the "save" button only be enabled at runtime when the SSN form field is valid, and to be disabled whenever the SSN form field is invalid. Configuration of the behavior/operations of actionable elements will be described in further detail below in conjunction with FIG. 7.

Figure 4:
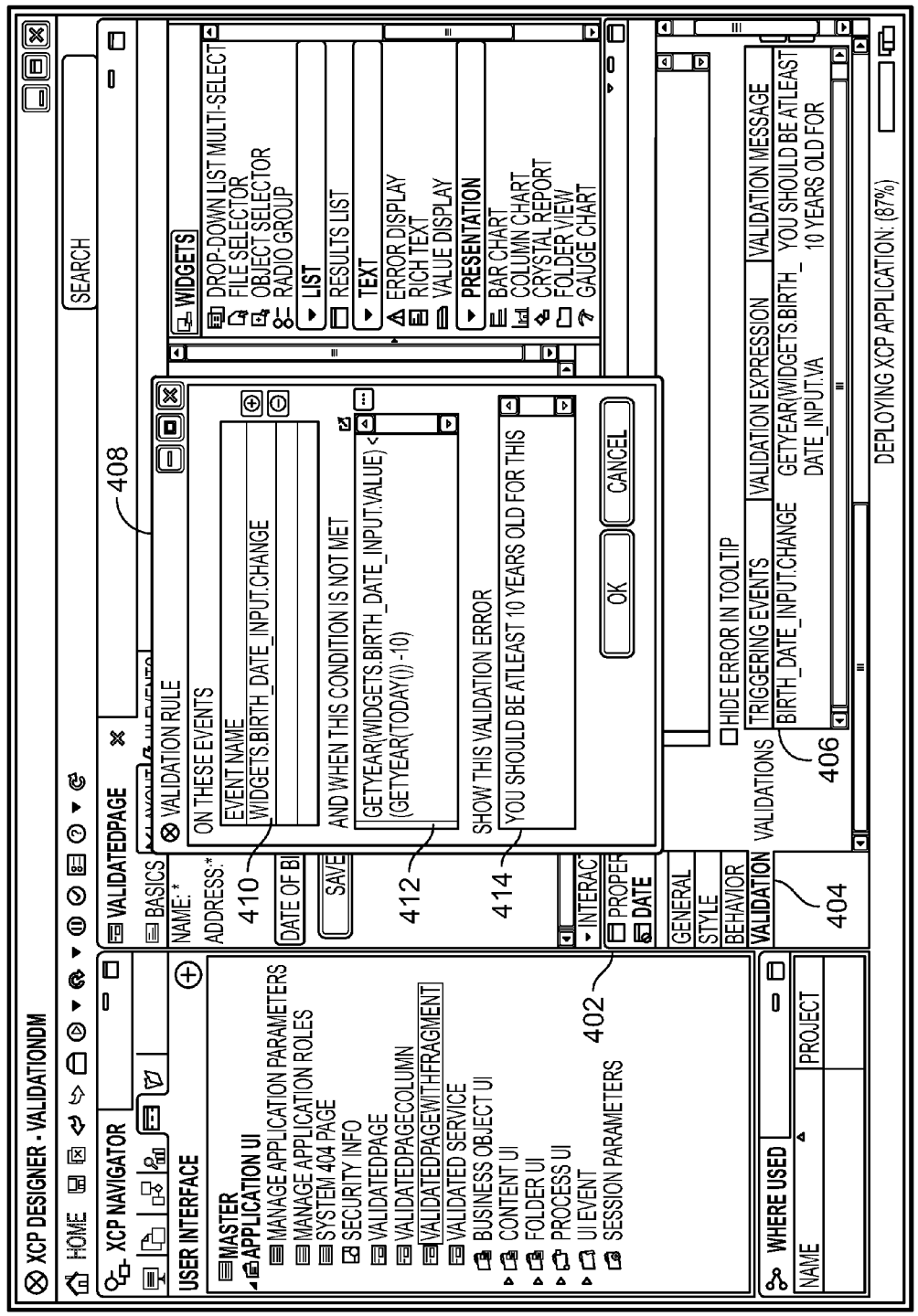
FIG. 4 is a diagram illustrating an example application graphical composition user interface for configuring validation for an application page element in an example embodiment of a system for hierarchical expression-based validation.

FIG. 4 is a diagram illustrating an example application graphical composition user interface for configuring validation for an application page element in an example embodiment of a system for hierarchical expression-based validation. In various embodiments, developer tool 112 of application platform 110 of FIG. 1 may be configured to present an application graphical composition user interface, such as that shown in FIG. 4. In some embodiments, at least a portion of process 300 of FIG. 3 is implemented using an application graphical composition user interface, such as the one shown in FIG. 4. The application graphical composition user interface of FIG. 4 can be used by a developer user to define an application during design time. In some embodiments, the application graphical composition user interface of FIG. 4 is web-based and can be accessed by the developer user at a developer client, such as developer client 130 of FIG. 1, over a network. In other embodiments, the developer tool is a native developer tool accessible by the developer user at the developer client.

In this example, configuration of a validation rule for a date of birth form field in a page of an application being designed, for example, by a developer user at design time, is shown. In this example, a developer user has selected to configure validation for a date of birth field (i.e., a field in which an end-user, at runtime, enters their date of birth). For example, upon selecting the date of birth field in a layout preview portion of an application graphical composition user interface, properties panel 402 is presented to the user, where various properties of the date of birth field are exposed to be configured by the developer user. In this example, the developer user has elected to configure the validation properties of the field by selecting the "validation" tab at 404. In response, various options for configuring the validation of the date of birth field are presented to the developer user. In this example, the developer user selects to configure a validation rule at 406, and in response, a panel for configuring the properties of the validation rule to be configured is caused to be displayed at 408.

In the example of 408, the developer user, at 410, specifies the event(s) on which the validation rule is triggered. In this example, the validation rule is to be triggered in the event that an input change event occurs with respect to the date of birth input of the field at runtime. In some embodiments, when configuring the event upon which the validation rule is to be triggered, the developer user is presented with various exposed properties of the field which can be evaluated to determine when an event has occurred. In this example, the following event is checked for at runtime: "widgets.birth_date_input.change." In this example, according to the event specification, any change in the input of the birth date input widget will be detected to trigger the validation rule.

At 412 of validation rule configuration panel 408, the developer user specifies (e.g., via an expression properties editor, as will be described in further detail below) a validation expression with respect to the validation rule. In this example, the validation expression is used to express a condition that, if not met, will cause an error message to be displayed. In this example, the validation expression is a mathematical/logical expression that checks if the date entered at runtime is more than 10 years older than the year of the current date. In this example, the following expression has been specified to express the rule: "getYear(widgets.birth_date_input.value)<(getYear(today(  ))−10)." According to the expression, at runtime, the "year" property of the input value to the form field will be obtained, which is in turn compared to see if it is a smaller numerical value than 10 years subtracted from the retrieved current year (i.e., the expression, when executed, checks whether the input value is more than 10 years older than the current year). In some embodiments, a Boolean value (e.g., "true" or "false") is returned at runtime as a result of an evaluation of the expression. Other values, such as a "1" or "0" can be returned. In the example shown, the validation expression will be caused to be evaluated in response to the occurrence of the event specified at 410.

At 414 of validation rule configuration panel 408, the developer user specifies the validation error message to be shown to an end-user at runtime if the condition specified using the expression configured at 410 is not met. In this example, the error message "You should be at least 10 years old for this" will be shown. In various embodiments, other types of actions can be configured.

Thus, according to the validation rule configuration shown at 408, the validation error message "You should be at least 10 years old for this" will be shown at runtime when an input change event with respect to the date of birth field is detected (e.g., an end-user has provided a date of birth as specified at 410), and when the condition that the input value exceeds ten years from the current year is not met (e.g., as determined according to the expression configured by the developer user at 412).

As described above, page elements can be grouped into logical containers, resulting in a page hierarchy, where, for example, a logical container is a parent node of the child elements included in the container. Containers may also be grouped/nested into parent containers (where the included containers are also referred to as "fragments"), such that containers can be child nodes of higher level parent containers. As will be described in more detail below, using the hierarchical validation mechanism described herein, validation can be configured at any level of the hierarchy. For example, the validation status of a particular container in the hierarchy can be configured to be dependent on the elements and/or container fragments included within the particular container. Code can be generated such that at runtime, changes in validity status of child elements and/or child container fragments are propagated to parent nodes in the hierarchy, which in turn listen for, and consume, the validity status change events. The child validity status change events are then processed by the listening/consuming parent nodes according to the configuration (e.g., validation configuration/behavior) of the parent nodes.

Figure 5:
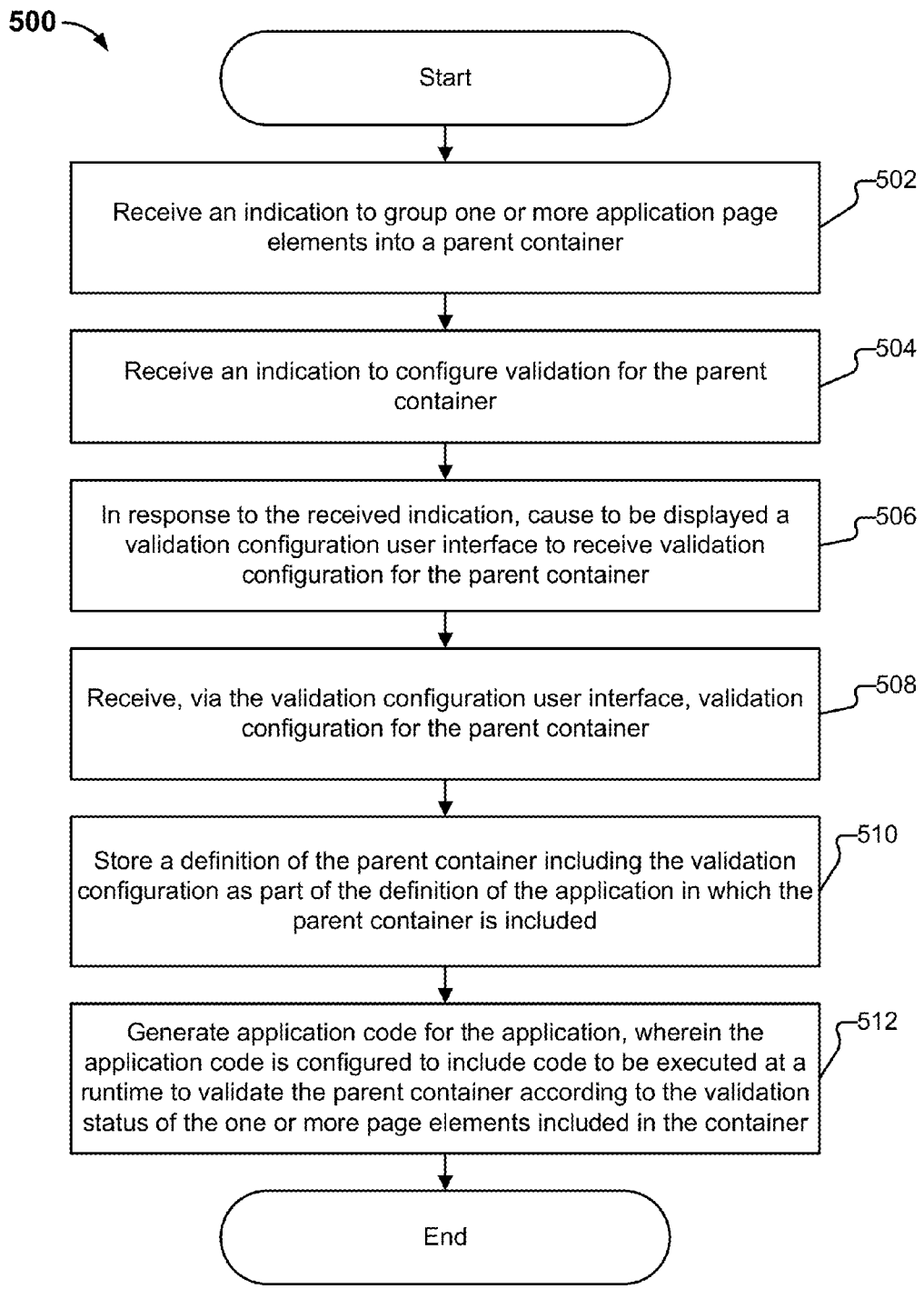
FIG. 5 is a flow chart illustrating an example embodiment of a process and system to configure hierarchical validation.

FIG. 5 is a flow chart illustrating an example embodiment of a process and system to configure hierarchical validation. In some embodiments, the process of FIG. 5 may be implemented by an application platform (e.g., application platform 110 of FIG. 1) and/or a component thereof, such as developer tool 112 of application platform 110 of FIG. 1. In some embodiments, process 500 continues from process step 308 of FIG. 3 (e.g., after an application page element is configured), but may also be performed separately.

Process 500 describes an example process for configuring hierarchical validation during design time.

The process begins at 502, when an indication to group one or more application page elements into a parent container is received. For example, suppose that a developer user is using an application graphical composition user interface to design a page of an application, and has included (e.g., by dragging and dropping elements from a side panel of the graphical composition user interface) three form field widgets: a field for soliciting the name of an end-user, a field for soliciting the address of the end-user, and a field for soliciting the date of birth of the end-user. Configuration of validation properties for the three form field widgets has been performed, for example, using process 300 of FIG. 3.

In this example, suppose that the developer user has arranged the three widgets into a column in the layout of the application page being designed. The developer user can, via the application graphical composition user interface, define the three widgets to be grouped into a logical parent container, where the validity of the parent container is to be dependent upon the validation status of the three included widgets. In this example, the developer user indicates that they would like to group the elements into a parent container, for example, by using their mouse cursor to select/highlight the three widgets in the application graphical composition user interface. In this example, three application page elements are included in the container. However, a container can include any number of application page elements and/or inner fragment containers.

In some embodiments, a container comprises a logical construct that is defined/specified for the purpose of being able to designate validation rules that apply to the elements contained inside the container, where the validation rule(s) for the container need be specified only once, for example, as a property of the container. By using logical containers, creation of a page hierarchy is facilitated, allowing, for example, a developer user to designate validation rules in a hierarchical manner. In some embodiments, a container is a logical construct that is not visible to end-users at runtime, but is rendered for a developer user to manipulate at design time.

At 504, an indication to configure validation for the parent container is received. For example, upon creating the container including the three widgets, the developer user selects the created container, causing a panel of container properties to be presented (where the definition of a container has been previously configured to include certain properties/attributes that are exposed to the developer user at runtime). Via the panel, the developer user elects to configure validation properties of the parent container (e.g., by selecting the "validation" properties tab in the properties panel with their mouse). At 506, in response to the received indication, a validation configuration user interface to receive validation configuration for the parent container is caused to be displayed.

At 508, validation configuration for the parent container is received via the validation configuration user interface. Similarly, to configure validation for application page elements as described in conjunction with process 300 of FIG. 3, a developer user can specify expression-based rules (e.g., via an expression properties editor, as will be described in further detail below) for defining how the validity of the parent container is to be determined.

For example, the validity status of the parent container can be specified, via an expression-based rule, to be based on any logical combination of the validation statuses of any of the contained elements. In some embodiments, each of the application page elements configured includes an attribute/property that can be exposed to other elements/containers that, for example, when queried, is used to indicate the validation status of the application page element. For example, an application page element may have an "invalid?" attribute/property, that returns "true" if the page element is valid, or returns "false" if the page element is invalid. An expression for determining the validity of the parent container can be expressed using these attributes.

For example, suppose that the developer user would like for the parent container to be valid only if all three of the name field, address field, and date of birth field are valid. One example of an expression that can be defined to express such a validation rule is the following, where, for example, the expression is entered into a field corresponding to a prompt for a validation rule expression used to determine that the parent container is valid if: "name.isvalid?==true AND address.isvalid?==true AND dateofbirth.isvalid?==true." In this example, the validation expression is specified using the validation statuses of the elements of the field (which will be retrieved during runtime) as combined using logical Boolean operators, resulting, for example, in a Boolean value of true or false.

Similarly, the developer user can define an expression that specifies that the parent container is invalid if any of the three fields are invalid. For example, suppose that the validation configuration panel provides a prompt and corresponding field for entering an expression used to determine whether the parent container is invalid. The developer user can enter, via the panel, the following example "name.isvalid?==false OR address.isvalid?==false OR dateofbirth.isvalid?==false."

The developer user can enter validation rule expressions that include any combination of the validation statuses of the contained/child elements. For example, the developer user could express a rule that relies only on the validation status of two of the three elements in the example above, or any other appropriate combination. In some embodiments, the developer user is able to input multiple validation rules/expressions used to determine the validity of the parent container, for example, based on different criteria, dimensions, combinations of element validity, etc.

At 510, a definition of the parent container including the validation configuration is stored as part of the definition of the application in which the parent container is included. For example, based on the validation configuration of the parent container, mappings between the three contained elements and the parent container are defined according to the configured validation rule expression(s) and are stored along with the definition of the application (e.g., to application definitions data store 114 of FIG. 1).

At 512, application code for the application is generated, wherein the application code is configured to include code to be executed at a runtime to validate the parent container according to the validation status of the one or more page elements included in the container. In some embodiments, the code is generated according to the definition of the application in which the logical parent container is defined (e.g., at 510). As described above, the ability to define logical containers allows for a developer user to establish/define a page hierarchy for the application page being composed/designed. In the page hierarchy, parent nodes, such as containers, are validated at runtime based on the validity status of child nodes, such as the page elements included in a container. In some embodiments, generating application code includes generating code that facilitates propagation of the validity status of elements and/or containers throughout a page hierarchy, which are listened for/consumed by other nodes in the page hierarchy. In some embodiments, the code is generated based on the established page hierarchy.

In some embodiments, code for validity mixins is generated, where the code is configured to publish the validity status of nodes (e.g., elements and/or containers) in the event of a validity state change event (i.e., whenever the state of their validity changes). For example, in the event that the validation status of an element or container changes, a validity state change event is fired. In some embodiments, the validity state change events are propagated to parent containers and/or other elements in a page hierarchy. In some embodiments, generating the code includes generating a message bus, which is used to propagate the validity state change events. In some embodiments, a validity state change event that is published includes an indication of the validity status of a child node (e.g., a flag or Boolean value) that is listened to/consumed by parent nodes in the hierarchy.

In some embodiments, code is generated for creating listeners for parent containers and other elements in the page hierarchy, which listen for published validity state change events propagated through the message bus. This allows for the parent containers and other elements to become aware of the validity status of other nodes in the page hierarchy.

In some embodiments, code for a relying page element and/or container (e.g., node whose validation status is reliant on the validity status of other elements in a page hierarchy) is generated such that a relying node consumes the validity state change events that are listened for, which in response causes the validity status of the relying node to be updated. The update of the validity status of a relying node may in turn trigger a validity state change event, which is then fired, published, and propagated to other nodes in the page hierarchy by the message bus.

As described above, in some embodiments, containers may also include other logical containers (also referred to herein as "fragment" containers), where the validation of a parent container is dependent on the validation status of a child container. For example, suppose that the parent container (referred to in this example as the "inner container") including the name, address, and date-of-birth fields is included in another container (referred to in this example as the "outer container"). In this example, the outer container is a parent of the inner container in the hierarchy of the page. Suppose for example, that the developer user would like to specify an expression that the outer container is valid if the inner container is valid. In some embodiments, rather than writing an expression that explicitly refers to the "isvalid?" properties of each of the name, address, and date-of-birth fields, the developer user can instead write an expression that refers directly to the inner container containing the three elements. For example, in some embodiments, the definition of a container includes a property "isvalid?" that can be used to return the validity status of the container as a whole when queried (where the validity of the container is configured as described above). Thus, for example, when configuring validation of the outer container, the developer user can write/enter an expression that checks for whether the inner container is valid or invalid to determine whether the outer container is valid. For example, the developer user can specify an expression that includes "innercontainer.isvalid?==true," without having to write an expression that explicitly checks the validity of each of the individual application page elements in the inner container. In some embodiments, at 512, application code is generated that is configured to include code to be executed at a runtime to validate the parent container according to the validation status of the page elements and/or container fragments in a parent container.

In some embodiments, rather than a developer user manually entering expressions for determining the validation status of the parent container, the validation configuration of the parent container is performed automatically by the developer tool/application platform. For example, once elements and/or containers have been grouped into a higher level container, default rules/expressions are generated, where for example, the parent container is defined to be valid if all child elements and/or containers are valid, and/or the parent container is defined to be invalid if any of the child elements and/or containers are invalid. In some embodiments, the developer user has options (e.g., via the application graphical composition user interface) to modify the default rules/expressions (e.g., deleting, editing, etc.) or to add more validation rules in addition to the generated default validation rules.

In some embodiments, as will be described in further detail below, the behavior of actionable elements can be configured to be controlled/dependent upon the validation status of containers in addition to individual application page elements, as described above. For example, suppose that the developer user includes in the page with the inner container and the three elements a "save" button element. The user can configure through the specification of an expression that the "save" button is to be enabled if the inner container is valid without having to write an expression where each of the individual contained application page elements is explicitly specified. Thus, at runtime, the save button is configured to consume the validity status of the inner container. Configuration of the behavior/operations of actionable flows/elements will be described in further detail below in conjunction with FIG. 7. In some embodiments, at 512, application code is generated that is configured to include code to be executed at a runtime to control the behavior of an action according to the validation status of the page element(s) and/or container(s) to which the action behavior is bound.

Thus, by configuring logical containers at design time, a page hierarchy can be established, where the validation status of child nodes in the hierarchy is propagated to parent nodes in the hierarchy. The parent nodes whose behavior/validation is dependent on the validation statuses of child nodes listen for and consume the propagated validation statuses, and perform appropriate processing according to their design time configuration. Additionally, by using logical containers at design time to facilitate creation of a hierarchy and hierarchical validation, the capability to express data validation at any level in a page hierarchy is provided, enabling a developer user, via an application composition graphical user interface, to reuse validation logic, perform validation chaining, perform field group validation, enable actionable elements, etc.

Figure 6:
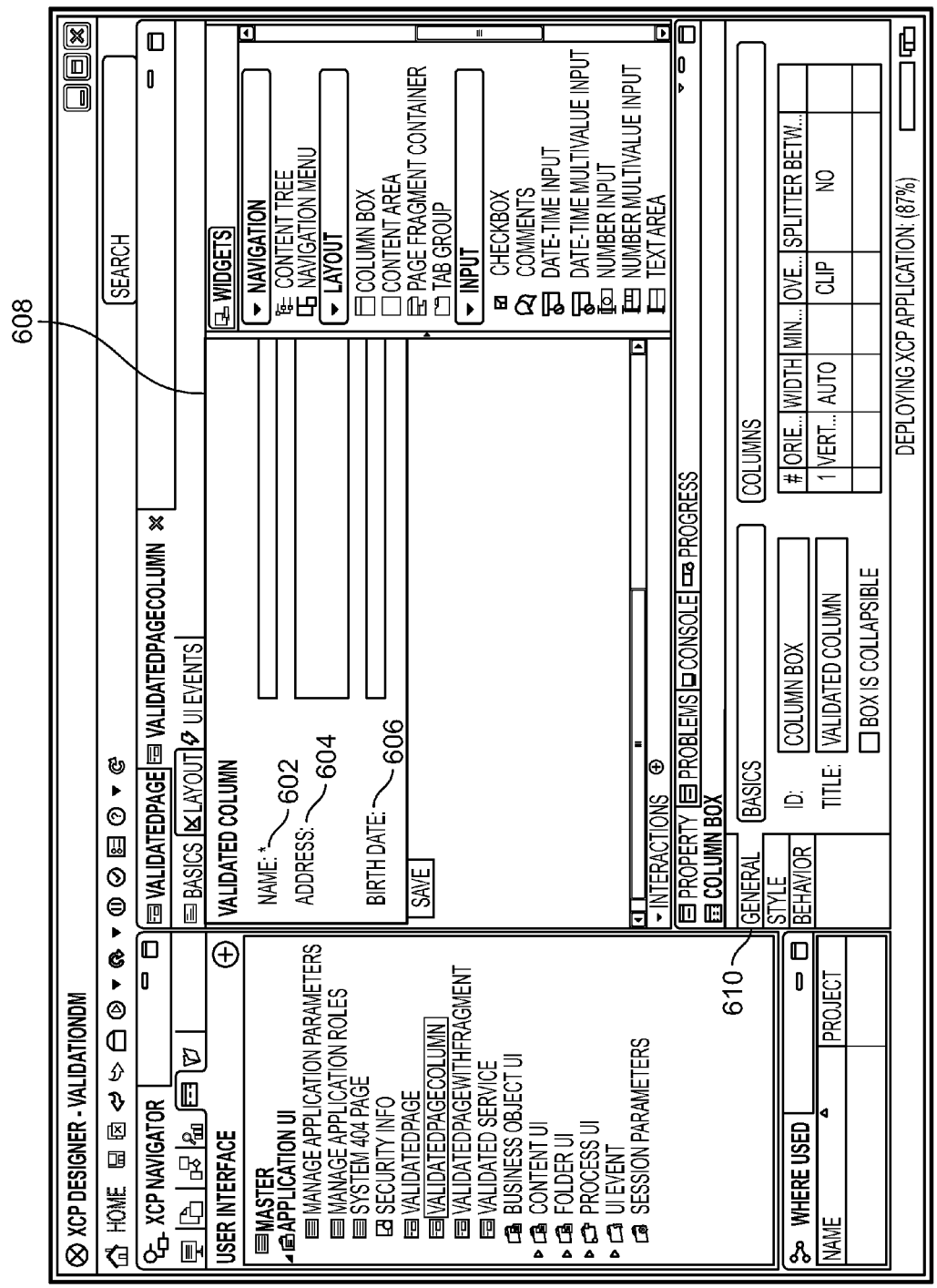
FIG. 6 is a diagram illustrating an example application graphical composition user interface for configuring a container in an example embodiment of a system for hierarchical expression-based validation.

FIG. 6 is a diagram illustrating an example application graphical composition user interface for configuring a container in an example embodiment of a system for hierarchical expression-based validation. In various embodiments, developer tool 112 of application platform 110 of FIG. 1 may be configured to present an application graphical composition user interface, such as that shown in FIG. 6. In some embodiments, at least a portion of process 500 of FIG. 5 is implemented using an application graphical composition user interface, such as the one shown in FIG. 6. The application graphical composition user interface of FIG. 6 can be used by a developer user to define an application during design time. In some embodiments, the application graphical composition user interface of FIG. 6 is web-based and can be accessed by the developer user at a developer client, such as developer client 130 of FIG. 1, over a network. In other embodiments, the developer tool is a native developer tool accessible by the developer user at the developer client.

In the example shown, a user (e.g., developer user) is composing, using the example interface shown, a page of an application. In this example, the user has previously included three widgets into the layout of the page, a "name" text input field/widget 602, an "address" text input field/widget 604, and a "date of birth" input widget/field 606 (e.g., an example of the date of birth field described in the example interface of FIG. 4). In this example, the developer user has arranged the three fields in a column. The developer user has further grouped, at 608, the three fields into a logical container (also referred to herein as a "column box"). For example, the user can select each of the three elements to be grouped, or use a mouse cursor to select all three elements together to be contained in the group.

As shown in the example, properties of the column can be configured at 610. Example types of properties that can be further explored/configured include general properties, style properties, and behavior properties. In some embodiments, the validation properties of the container/column are automatically configured according to the validation configuration of the elements/widgets contained within the container/column box, as described above.

Figure 7:
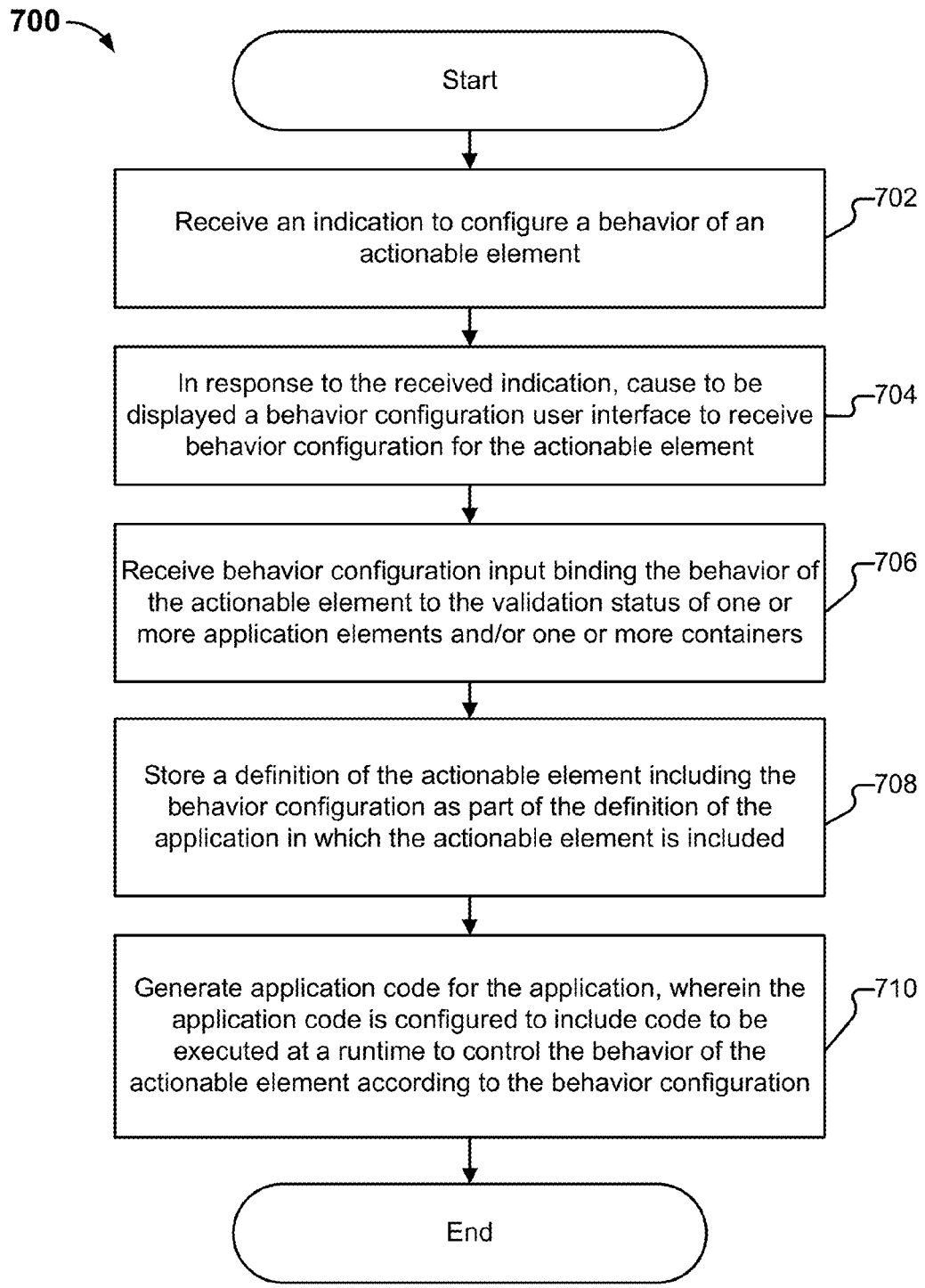
FIG. 7 is a flow chart illustrating an example embodiment of a process and system to configure behavior of an actionable element.

FIG. 7 is a flow chart illustrating an example embodiment of a process and system to configure behavior of an actionable element. In some embodiments, the process of FIG. 7 may be implemented by an application platform (e.g., application platform 110 of FIG. 1) and/or a component thereof, such as developer tool 112 of application platform 110 of FIG. 1. In some embodiments, process 700 continues from process step 308 of FIG. 3, process step 512 of FIG. 5 (e.g., after application page element(s) and/or container(s) are configured), or may be performed separately.

Process 700 describes an example process for configuring behavior of an actionable element during design time. In some embodiments, actionable elements include application page elements (e.g., widgets) whose behavior is determined, for example, based on the validation status of the elements and/or containers to which the action is bound.

The process begins at 702, when an indication to configure a behavior of an actionable element is received. For example, suppose that a developer user wishes to configure the behavior of a "save" button widget on a page, which is to be configured to save the input that was solicited for by the form fields in the page. As one example, a developer user has configured, including configuration of validation properties, a name form field to solicit the name of an end-user, an address form field to solicit the address of an end-user, and a date-of-birth field to solicit the date of birth of an end-user, as described above in accordance with the process of FIG. 5. The developer user would like to bind the enablement/disablement behavior (i.e., when the "save" button is available or unavailable to an end-user) of the page to the validation status of the three elements. In order to configure the "save" button object in the layout of the page, the developer user, via the application graphical composition user interface, uses a mouse cursor to select the "save" button.

At 704, in response to the selection, a properties panel for configuring the properties of the actionable element is presented to the user. In some embodiments, the properties panel includes a tab for accessing a section for the behavior properties of the actionable element, which is presented to the developer user in response to the developer user selecting the behavior properties tab.

At 706, behavior configuration input binding the behavior of the actionable element to the validation status of one or more application elements and/or one or more containers is received. For example, suppose that the developer user would like to configure when the "save" button is enabled or disabled (e.g., so that an end-user is allowed to or prohibited from saving the form fields on the page). The developer user would like to configure the "save" button such that the button is only enabled when all of the fields are valid. If any of the fields are invalid, then the "save" button should not be enabled. In some embodiments, the developer user is provided, via the application graphical composition user interface, an opportunity to write an expression that binds the enablement/disablement action behavior of the "save" button to the validation status of the name, address, and date of birth fields. In some embodiments, an expression properties editor is used by the developer user to specify the expression, as will be described in further detail below.

In one embodiment, the developer user can write an expression in which the behavior of the "save" button is explicitly bound to the validation statuses of each of the individual elements. For example, the developer user can write the following example expression such that the "save" button is enabled if: "name.isvalid?==true AND address.isvalid?==true AND dateofbirth.isvalid?==true" (i.e., that the "save" button is enabled only if all three elements have a valid status). The developer user can also write the following example expression such that the "save" button is disabled if: "name.isvalid?==false OR address.isvalid?==false OR dateofbirth.isvalid?==false" (i.e., that the "save" button is disabled if any of the three elements are invalid). In the above example, the validity statuses of the fields are exposed through the respective "isvalid?" properties associated with the elements.

In some embodiments, the actionable element can be bound to the validity status of a container. For example, suppose that the name, address, and date-of-birth fields have been grouped into a logical container, where the container has been configured such that it is valid if all three of the elements are valid, and invalid if any of the three elements is invalid. In such an example, rather than writing a behavior expression as described above, in which each of the validation statuses of the individual elements is explicitly specified, the developer user can instead write an expression that directly behinds the enablement/disablement behavior to the parent container. For example, the developer can write the following example expression specifying that the "save" button is enabled if: "container.isvalid?==true" or that the "save" button is disabled if: "container.isvalid?==false." In the above example, the validity status of the container is exposed through the "isvalid?" property associated with the container.

Thus, writing an expression binding the actionable element to the validation statuses of multiple elements can be simplified, where the developer user can configure operations/actions that only have to refer to the validity of a container as a whole, without having to explicitly refer to individual components of the container.

In various embodiments, expressions can be written that bind that behavior of an actionable element to any combination of application page elements and/or containers.

In some embodiments, the behavior of actionable elements is bound to one or more data services. In some embodiments, a data service is a stateless process that is configured to perform various types of processing. As one example, a data service can be configured to take as input, values solicited by the name field. The data service can then be configured to perform validation services (e.g., using developer user specified validation expressions) on the input value for the name field, to determine, for example, whether the length of the name field is appropriate. An actionable element, such as the "save" button can then be bound to such a data service (e.g., bound to the results of the data service evaluation/processing).

In the above example, a "save" button of a page of a form was described as one example of an actionable element. Another example of an actionable element is an error display widget whose behavior can be configured (e.g., according to process 700 of FIG. 7) such that for the element displays, in one area of the end-user runtime interface, all of the error messages associated with form fields that are determined to be invalid. The error display widget can also be configured to be bound to one or more data services, as described above.

At 708, a definition of the actionable element including the behavior configuration is stored as part of the definition of the application in which the actionable element is included. For example, the definition of the actionable element, including the validation expressions and the bindings/mappings to element(s), container(s), and/or data service(s), is stored in the definition of the application (e.g., to application definitions data store 114 of FIG. 1).

At 710, application code is generated for the application, wherein the application code is configured to include code to be executed at a runtime to control the behavior of the actionable element according to the behavior configuration. In some embodiments, the application code is generated according to the definition of the application stored at 708 In some embodiments, generating the code for the application includes generating code for propagating validity status information in a hierarchy, which can include code for generating message buses, listeners, consumers, publishing validity state change events, etc. For example, in some embodiments, code generated for an actionable element to be executed at a runtime is configured to listen for validity status change events published/fired from application page element(s), container(s), and/or data service(s) to which the behavior of the actionable element is bound, where the published event may be propagated through a page hierarchy via a message bus. The code generated for the actionable element to be executed is further configured to consume any relevant validity status change events that were listened for, and update the behavior of the actionable element according to the behavior configuration as described above.

Figure 8:
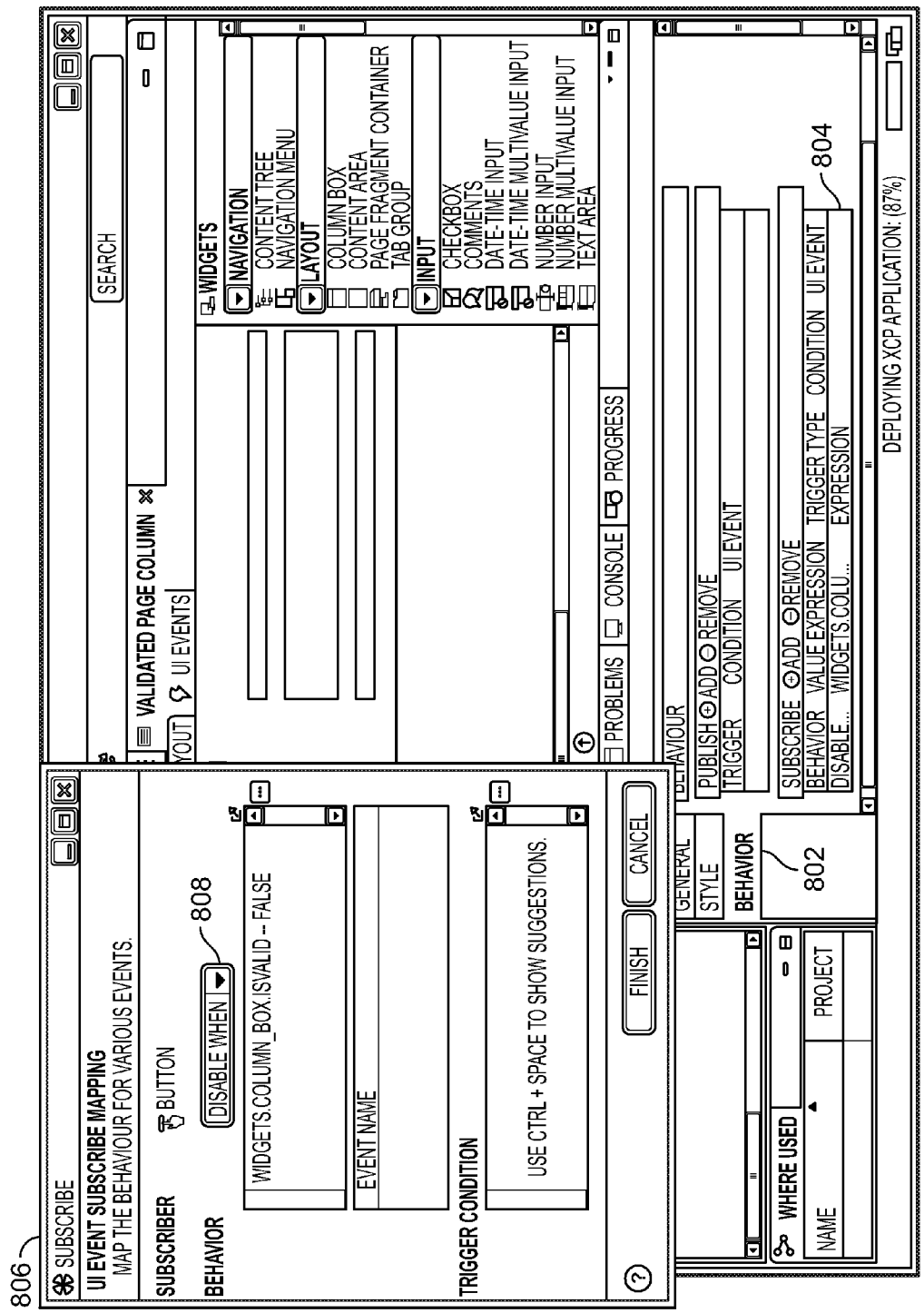
FIG. 8 is a diagram illustrating an example application graphical composition user interface for configuring the behavior of an actionable element in an example embodiment of a system for hierarchical expression-based validation.

FIG. 8 is a diagram illustrating an example application graphical composition user interface for configuring the behavior of an actionable element in an example embodiment of a system for hierarchical expression-based validation. In various embodiments, developer tool 112 of application platform 110 of FIG. 1 may be configured to present an application graphical composition user interface, such as that shown in FIG. 8. In some embodiments, at least a portion of process 700 of FIG. 7 is implemented using an application graphical composition user interface, such as the one shown in FIG. 8. The application graphical composition user interface of FIG. 8 can be used by a developer user to define an application during design time. In some embodiments, the application graphical composition user interface of FIG. 8 is web-based and can be accessed by the developer user at a developer client, such as developer client 130 of FIG. 1, over a network. In other embodiments, the developer tool is a native developer tool accessible by the developer user at the developer client.

In some embodiments, the example interface of FIG. 8 continues from the example interface of FIG. 6, in which a name field, an address field, and a date-of-birth field were configured and grouped into a logical container. In some embodiments, the example interface(s) of FIG. 8 are used to configure the behavior of a "save" button that is configured to save, at run time, the runtime input values to the three fields. In the example shown, the enablement/disablement behavior of the "save" button is configured to be dependent upon the validation statuses of the three widgets, as specified via an expression (e.g., using an expression properties editor as described below).

In the example shown, a user, at design time, has selected to configure the behavior of the "save" button by selecting the behavior tab at 802. In this example, one or more behaviors to which the element subscribes can be configured at 804 (e.g., by selecting the "add" button). In response to an indication to map the behavior of the element to an event, panel 806 is caused to be displayed.

Panel 806 provides various options for specifying the mapping of the behavior of the "save" button to a validation event. In this example, at 808, a developer user has specified that the "save" button should be disabled (i.e., behavior) when the logical container (e.g., the column box of FIG. 6) including the three elements is invalid. In the example shown, the developer user specifies this behavior by specifying the expression ("widgets.column_box.isvalid"==false) (e.g., using an expression properties editor as described in further detail below). Thus, for example, at runtime, the "invalid?" property of the column box (which is a property of the logical container that will be exposed at runtime and published/propagated) will be listened for and consumed. If the column box is false (e.g., any of the elements in the container are invalid), then the "save" button is disabled. In this example, because the behavior is bound directly to the container that includes the three elements (and is therefore, indirectly dependent on the validation statuses of the three elements), an expression directly referencing the validation status of the container can be used, without having to explicitly reference the three elements in the expression. In an alternative embodiment, a developer user could write a logical expression that directly references the validation status property of each of the elements. For example, a user could use an expression editor to write an expression such that the "save" button is disabled when "widgets.name_input.isValid==false OR widgets.address_area.isValid==false OR widgets.birth_date.input.isValid==false".

Figure 9:
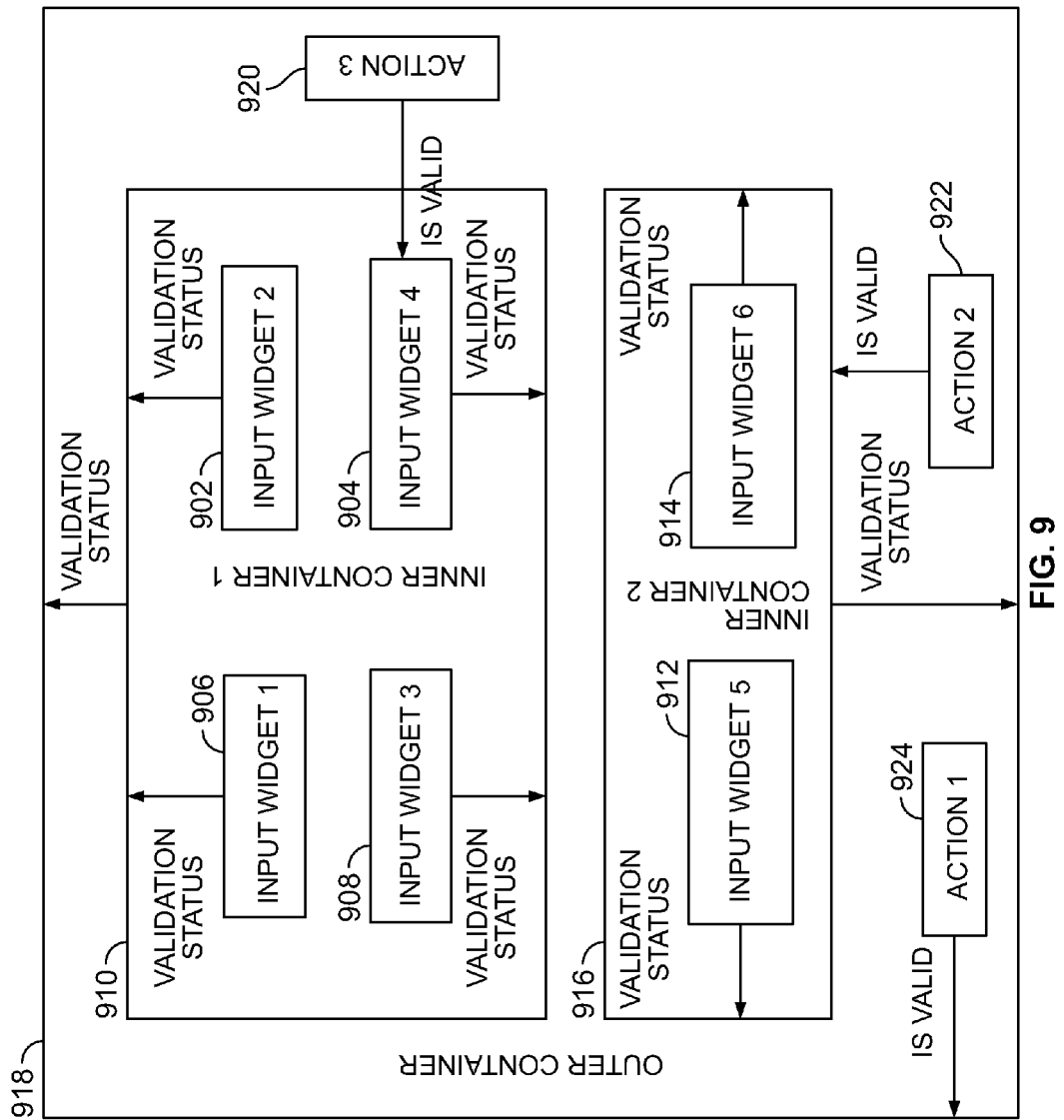
FIG. 9 is a diagram illustrating an example embodiment of a logical block diagram of a page in which expression-based hierarchical validation is performed in an example embodiment of a system for hierarchical expression-based validation.

FIG. 9 is a diagram illustrating an example embodiment of a logical block diagram of a page in which expression-based hierarchical validation is performed in an example embodiment of a system for hierarchical expression-based validation. In some embodiments, the following example diagram depicts validation status propagation and consumption throughout a page hierarchy of a page of an application. In some embodiments, the page has been configured using the techniques described herein.

In this example, a page configured (e.g., during design time) to include various widgets and actions is shown. Also shown are representations of logical containers configured to include various groupings of widgets and containers. In this example, input widgets 1-4 (902-908) have been grouped into inner container 1 (910). Input widgets 5 (912) and 6 (914) have been grouped into inner container 2 (916). Inner containers 1 and 2 have in turn been grouped into an outer container (918). The organization of the elements and containers (e.g., as composed at design time) reflect a page hierarchy that has been established for the page.

Regarding inner container 1, based on the established grouping, the validation statuses of input widgets 1-4 grouped into inner container 1 are published and propagated (e.g., at runtime) up to its parent node in the hierarchy (e.g., via a message bus), which includes inner container 1. Inner container 1's validation status is dependent on the validation statuses of input widgets 1-4. For example, inner container 1 is configured/determined to consume the validation statuses of widgets 1-4 and be valid if widgets 1-4 are all valid. As another example, inner container 1 is configured/determined to be invalid if any of widgets 1-4 are invalid.

Inner container 1, having been grouped into the outer container, in turn has its validation status propagated up to the outer container. In the example shown, action 3 (920) is specified outside of the inner container 1 group of elements, and is bound directly to the validation status of input widget 4. At runtime, action 3 is bound to the validation status of input widget 4 according to the configuration of the behavior of action 3, where action 3 is configured to consume the published validation status of input widget 4 (e.g., as specified via an expression that is dependent on the validation status of input widget 4).

Regarding inner container 2, based on the established grouping, the validation status of input widgets 5-6 grouped into inner container 2 are propagated up to its parent node in the hierarchy, which includes inner container 2. Inner container 2's validation status is dependent on the validation statuses of input widgets 5-6 Inner container 2, having been grouped into the outer container, in turn has its validation status propagated up to the outer container (e.g., which is a parent node in the page hierarchy). In the example shown, action 2 (922) is bound to inner container 2, such that whether action 2 is performed is based at least in part on the validity status of inner container 2, which is in turn based on the validity statuses of input widgets 5 and 6. Thus, for example, action 2 is enabled only when inner container 2 is valid, which in turn is only valid when, for example, input widgets 5 and 6 are also valid.

Regarding the outer container, as shown in the example of FIG. 8, the outer container's validity status is dependent on the validity status of inner containers 1 and 2. For example, the outer container is configured to have a valid status if both inner containers 1 and 2 are valid, and is configured to be invalid if either of containers 1 and 2 is invalid. In the example shown, action 1 (924) is enabled only when the outer container 1, and by extension, when input widgets 1-6 are all valid.

By having first created an outer container that includes sub-containers of widgets, a developer user could, for example, simply write an expression for action 1 such that its behavior is based simply on the validity status of the outer container, without having to write an expression in which each and every input widget is explicitly listed along with any operators to realize the required logic/behavior.

Figure 10:
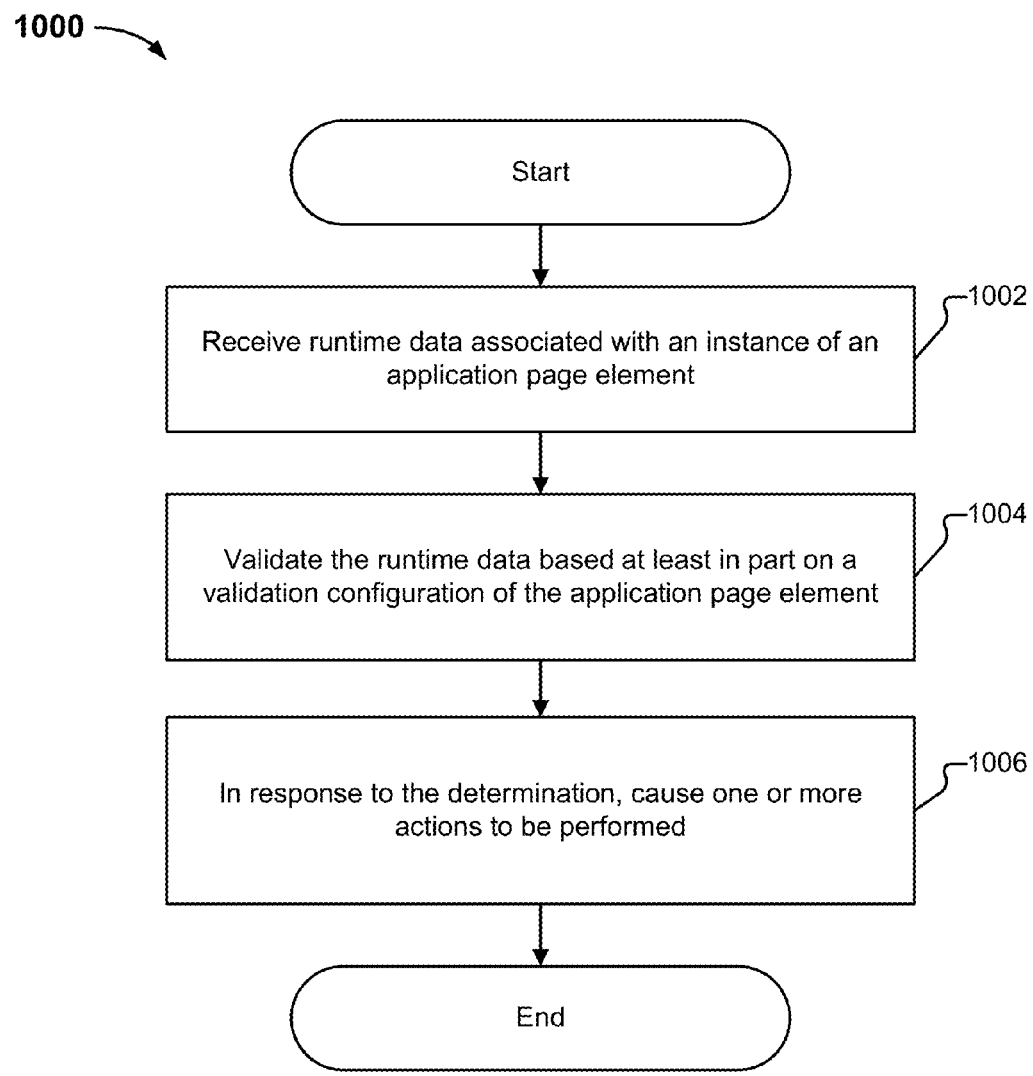
FIG. 10 is a flow chart illustrating an example embodiment of a process and system to perform runtime validation.

FIG. 10 is a flow chart illustrating an example embodiment of a process and system to perform runtime validation. In various embodiments, application platform 110 of FIG. 1 may be configured to implement process 1000 of FIG. 10. In some embodiments, specifically, application server 120 of application platform 110 of FIG. 1 may be configured to implement process 1000 of FIG. 10. In some embodiments, end user client 150 of FIG. 1 may be configured to implement process 1000 of FIG. 10.

Process 1000 describes an example process of performing, at runtime, validation with respect to an application page element. In some embodiments, the application code that is deployed and executed at runtime includes code generated according to process step 204 of FIG. 2, process step 512 of FIG. 5, and process step 710 of FIG. 7, as described above.

The process begins at 1002 when runtime data associated with an instance of an application page element is received. For example, at runtime, an end-user enters their name, address, SSN, and date of birth into input widgets/fields configured to, respectively, solicit the name, address, SSN, and date of birth of the end-user.

At 1004, the runtime data is validated based at least in part on a validation configuration of the application page element. As one example, the runtime data is validated based at least in part on a validation configuration of the application page element as described in conjunction with process 300 of FIG. 3. For example, suppose that when configuring validation for the SSN field at application design time, a developer user wrote validation rule expressions (e.g., as described above in conjunction with FIG. 3) to determine if the runtime input is valid or invalid by checking if the value inputted into the SSN field is of the appropriate length and that only numeric digits have been entered. In some embodiments, the validation rule expressions/definitions that were configured by the developer user at runtime are used to generate runtime code that, when executed, checks the input value of the SSN field according to the previously configured validation expressions. For example, if the value entered by the end-user into the SSN form field is determined to have an appropriate length of nine characters, and only includes legal numeric digits, then the solicited runtime input value is determined to be valid. However, if either the length is incorrect or illegal characters were entered, then the solicited runtime value is determined to be invalid.

At 1006, in response to the determination, one or more actions are caused to be performed. As one example, if the application page element was configured by the developer user at design time to produce an error message if the runtime page element instance was determined to be invalid, then the error message is caused to be displayed or otherwise presented in an end-user runtime user interface in response to determining that the field is invalid. For example, if the runtime input to the SSN form field was determined to be of an incorrect length, the error message configured by the developer user corresponding to the validation rule that checks the solicited input value for an appropriate length is caused to be displayed (e.g., the error message "the SSN must be 9 digits" can be displayed), Other actions can be taken. For example, the validation status of the application page element instance can be made available. For example, suppose that the application page element was configured by a developer user at design time and via an application graphical composition user interface such as those described above, to be included in a parent container of a page hierarchy. Actions can be taken, as described above, to propagate the validation status of the application page element instance to relying nodes in the page hierarchy at runtime. For example, according to the definition of the application and the page hierarchy, application code is generated such that, when executed at runtime, hierarchical validation is performed. For example, as described above, if a page hierarchy has been established for a page, code to implement message buses, publishers, listeners, etc. is generated and executed at runtime.

As one example, suppose that a page of an application includes instances of a name field element, address field element, and date of birth element that were grouped by the developer user, at design time, into a logical container whose validity status, as configured at design time, relies upon the validity status of the contained elements. At runtime, code is generated such that validity state change events associated with the elements are fired/published whenever a validity state change event occurs. Code is generated to implement a message bus used to propagate the validity state change events throughout a page hierarchy. Code for the parent container is generated to include a listener that listens for and consumes the validation state change events fired by the element instances. The validity status of the container is then updated according to its validation configuration, which can in turn be propagated to parent nodes of the page hierarchy.

Similarly, if actionable elements such as "save" buttons are included in an application page and bound to the validity status events of the page element instance, then the validation status of the application page element instance is propagated through the page hierarchy via the message bus and listened to and consumed by the actionable element. The actionable element's behavior is then determined based on the consumed validation status.

Figure 11:
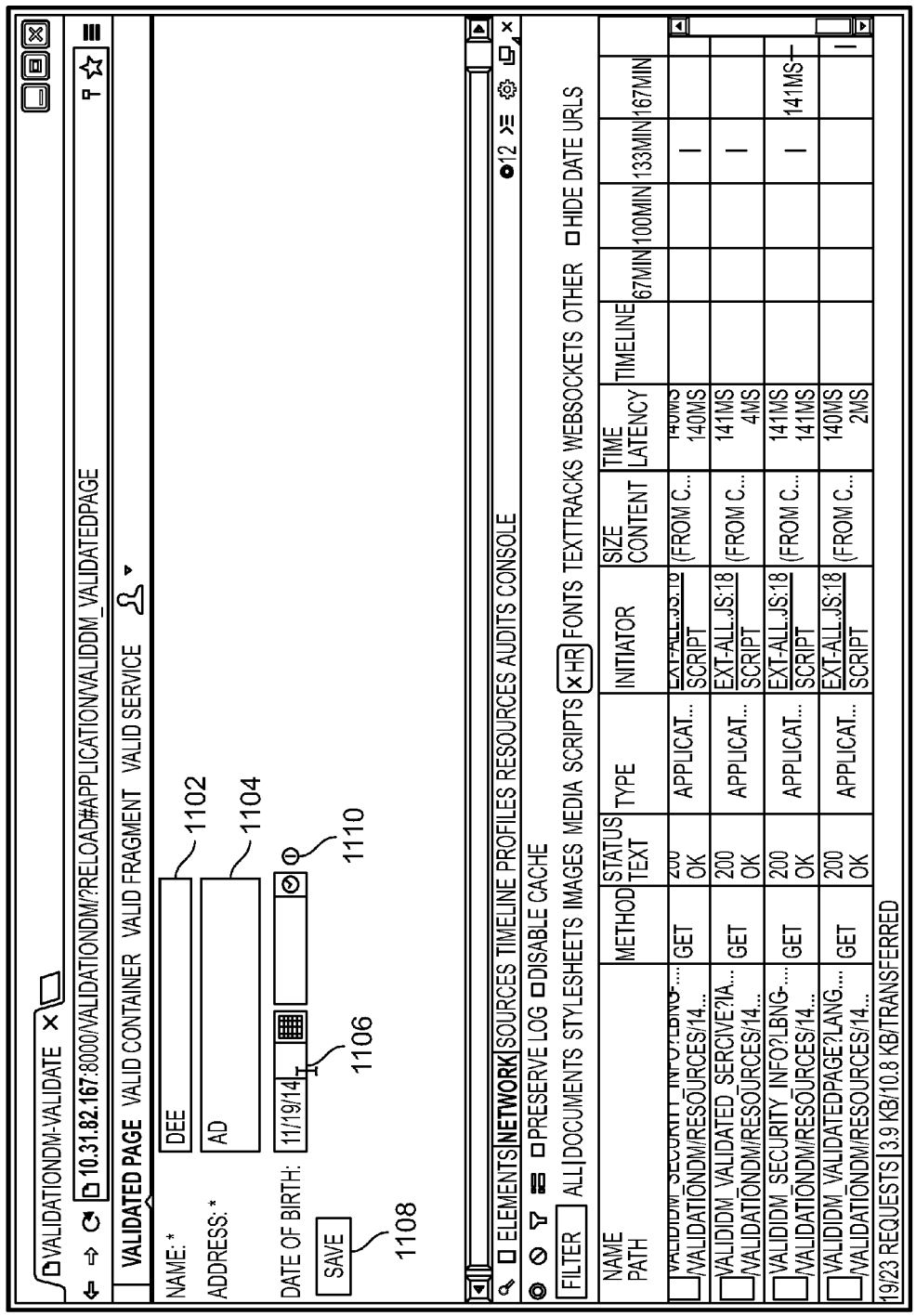
FIG. 11 is a diagram illustrating an example application runtime user interface in an example embodiment of a system for hierarchical expression-based validation.

FIG. 11 is a diagram illustrating an example application runtime user interface in an example embodiment of a system for hierarchical expression-based validation. In various embodiments, application server 120 of application platform 110 of FIG. 1 may be configured to present an application runtime user interface, such as the one shown in FIG. 11. In some embodiments, at least a portion of process 1000 of FIG. 10 is implemented using an application runtime user interface, such as the one shown in FIG. 11.

In this example, a runtime page of an application is shown. In some embodiments, the validation behavior of the runtime interface of FIG. 11 was previously configured by a developer user at a design time, for example, via the example application graphical composition user interfaces of FIGS. 4, 6, and 8 as described above. In some embodiments, the fields shown are instances of configured application page elements. In the example shown are name, address, and date-of-birth fields (1102-1106), as well as a "save" button (1108). In this example, runtime inputs have been entered with respect to each of the three fields. In this example, the runtime input with respect to the date of birth field has been determined to be invalid (e.g., according to a previously configured expression-based validation rule, such as the one specified in validation rule configuration panel 408 of FIG. 4).

In response to the determination that the input with respect to the date of birth is invalid, the invalid inputs are highlighted (e.g., in red) and an error warning symbol (1110) is displayed. In some embodiments, clicking on symbol 1110 causes an error message associated with the invalid field to be displayed. In some embodiments, the error message was previously configured at a design time (e.g., using the application graphical composition user interface(s) of FIG. 4).

Additionally, the "save" button has been disabled in response to the date of birth input having been determined to be invalid. In some embodiments, the runtime behavior of the button was previously configured, for example, at a design time, to be bound to the validation statuses of the three elements. For example, in some embodiments, the button has been configured to be disabled in the event that any of the three inputs/fields are invalid.

As one example, if the button is bound to the validation status of a logical container configured to include the three elements (e.g., as shown in the example interface(s) of FIG. 8), then the validation statuses of the elements are published and propagated (e.g., via message bus), and then consumed by the logical container. The validation status of the logical container is then determined based on the consumed validation status. The validation status of the logical container is then in turn published and propagated, and then consumed by the button, which uses the validation status of the logical container to determine whether to disable/enable the button. As shown, the "save" button has been disabled (e.g., greyed out and inaccessible to an end-user) because the runtime input to the date of birth field has been determined to be invalid.

In the above examples, a developer user, at design time, uses interface(s) to specify various expressions to be used in expression validation rules, actionable behaviors, etc. In some embodiments, expressions such as those described above are specified via an expression properties editor. In some embodiments, the expression editor is an interactive editor that provides a context sensitive expression content tree. In some embodiments, a developer user can select, from the expression context tree, various options for specifying/constructing an expression, such as functions, input widgets/elements, data model properties, etc. (e.g., components of the expression, such as inputs and the functions used to process those inputs to determine a result).

Figure 12:
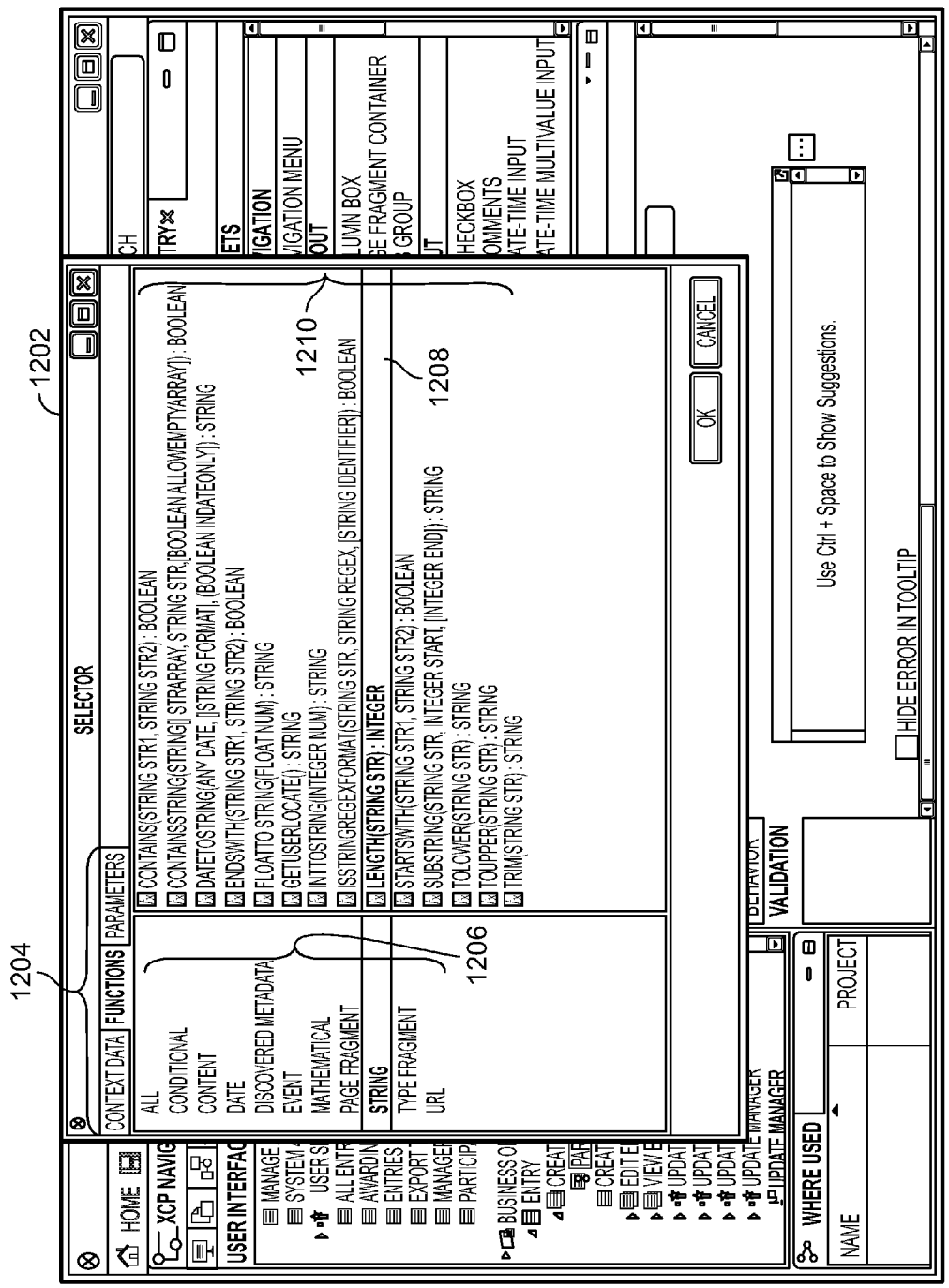
FIG. 12 is a diagram illustrating an example expression properties editor in an example embodiment of a system for hierarchical expression-based validation.

FIG. 12 is a diagram illustrating an example expression properties editor in an example embodiment of a system for hierarchical expression-based validation. In some embodiments, the expression properties editor comprises an editor for specifying the properties of an expression. In some embodiments, the expression properties editor provides an expression context tree, for specifying the expression. In some embodiments, the context tree includes different branches/types of components that can be configured, such as functions, input widgets/elements, data model properties, etc. Under each type of component, further levels of configuration are provided in the context tree for specifying further details of a component. In this example, using editor 1202, a developer user can select the various components for building an expression. In this example, the types of components include context data, functions, and parameters, which can be viewed and selected from using the respective tabs at 1204. In this example, the "functions" tab of the editor has been selected. From this tab, a developer user can select, at 1206, functions of various types to select from when specifying the function of the expression. In this example, functions used to process strings have been selected. In this example, as shown at 1208, a function for determining the length of a string that produces an integer type output has been selected from a set/list of candidate, available string functions (1210). In some embodiments, the list of functions shown at 1210 is an example of a context sensitive context tree from which an appropriate function is selected.

Figure 13:
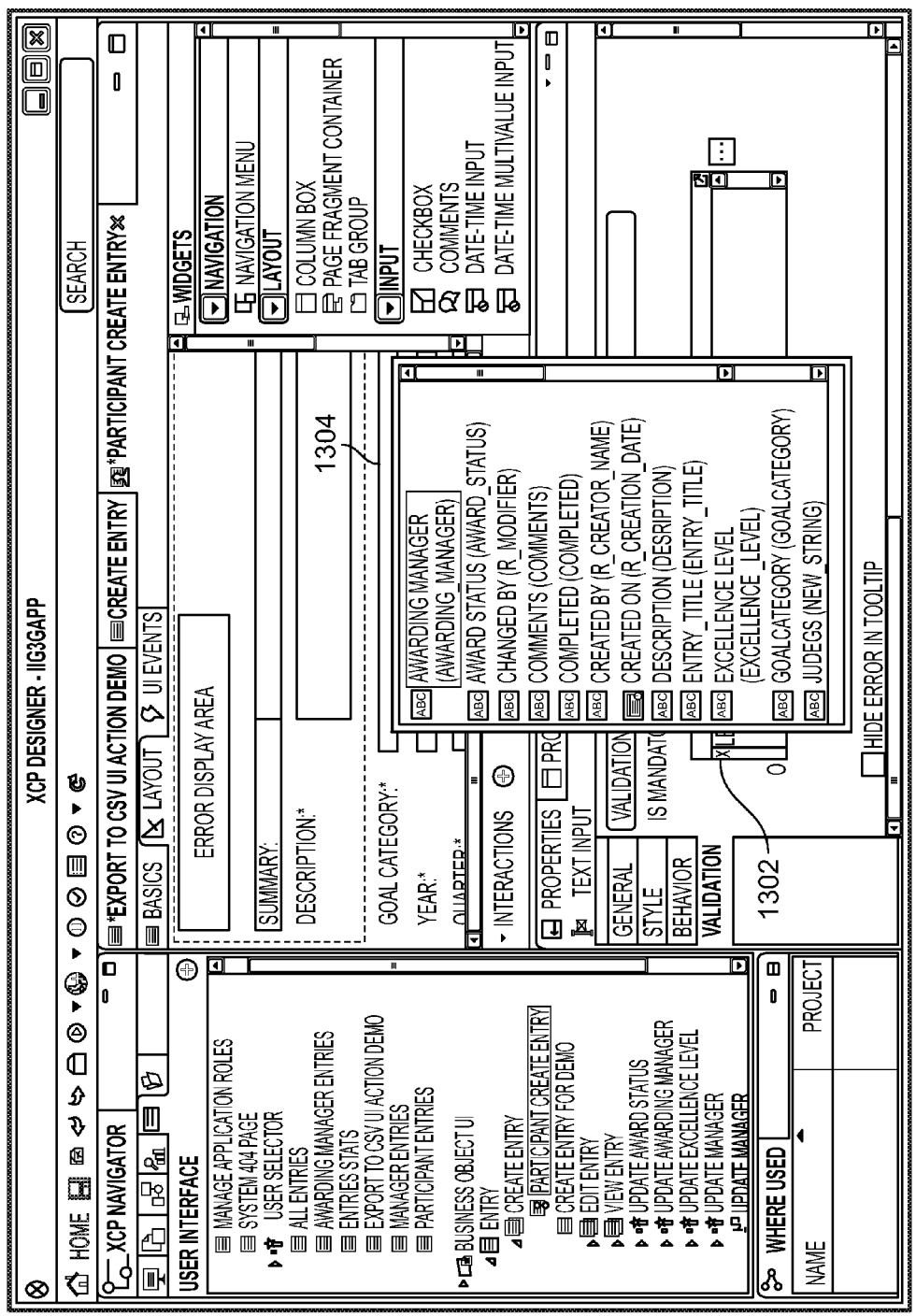
FIG. 13 is a diagram illustrating an example expression properties editor in an example embodiment of a system for hierarchical expression-based validation.

FIG. 13 is a diagram illustrating an example expression properties editor in an example embodiment of a system for hierarchical expression-based validation. In this example, a developer user is specifying, at 1302, an expression for the "Is Mandatory" field of a validation configuration panel. In this example, as the user is typing/entering the expression, an inline help context menu 1304 is displayed (e.g., dynamically, in real-time, as the developer user is entering the expression), which provides suggestions/assistance for completing (e.g., the next step) of the expression. For example, in this example, a context menu with the available candidate options for the attribute of the "entry" element are displayed to the developer user. The developer user can then select their desired option from context menu 1304.

In various embodiments, expression-based, hierarchical validation of an application page is configured during the design time of the application (e.g., by a developer user using a developer tool that provides an application graphical composer user interface for designing the application). During runtime, runtime data with respect to application page elements is validated according to the configured validation, the results of which may be propagated to other nodes in a page hierarchy.

Although the foregoing embodiments have been described in some detail for purposes of clarity of understanding, the technology is not limited to the details provided. There are many alternative ways of implementing the technology. The disclosed embodiments are illustrative and not restrictive.

What is claimed is:

1. A system, comprising:
a processor; and
a memory coupled with the processor, wherein the memory is configured to provide the processor with instructions which when executed cause the processor to:
receive, during an application design time, an indication to configure validation for an application page element;
in response to the indication, cause to be displayed a validation configuration user interface to receive validation configuration for the application page element;
receive, via the displayed validation configuration user interface, user input defining a validation expression that specifies a validation condition on the application page element;
receive, during the application design time, an indication to group the application page element, along with at least one other application page element, into a parent container;
receive validation configuration for the parent container, wherein the validation configuration includes a validation expression that specifies a validation condition on the parent container, and wherein the validation condition is based at least in part on a combination of validation statuses of the individual application page elements grouped into the parent container; and
generate, based at least in part on the validation expressions associated with the application page element and the parent container, code to be executed at a runtime to:
validate runtime data associated with an instance of the application page element; and
validate the parent container according to the validation statuses of the individual application page elements included in the parent container.

2. The system of claim 1, wherein the received validation configuration for the application page element further includes a specification of an error message to be displayed.

3. The system of claim 1, wherein the received validation configuration for the application page element further includes an indication of an event upon which validation is to be performed.

4. The system of claim 1, wherein the parent container includes a fragment of a container.

5. The system of claim 1, wherein the memory is further configured to provide the processor with instructions which when executed cause the processor to generate code to be executed at the runtime to propagate a validation status of the application page element to one or more parent nodes in a page hierarchy.

6. The system of claim 1, wherein a behavior of an actionable element is configured to be bound at least in part to a validation status of the application page element.

7. The system of claim 1, wherein a behavior of an actionable element is configured to be bound at least in part to a validation status of the parent container including the application page element.

8. A method, comprising:
receiving, via an interface and during an application design time, an indication to configure validation for an application page element;
in response to the indication, causing to be displayed a validation configuration user interface to receive validation configuration for the application page element;
receiving, via the displayed validation configuration user interface, user input defining a validation expression that specifies a validation condition on the application page element; and
receiving, during the application design time, an indication to group the application page element, along with at least one other application page element, into a parent container;
receiving validation configuration for the parent container, wherein the validation configuration includes a validation expression that specifies a validation condition on the parent container, and wherein the validation condition is based at least in part on a combination of validation statuses of the individual application page elements grouped into the parent container; and
generating, based at least in part on the validation expressions associated with the application page element and the parent container, code to be executed at a runtime to:
validate runtime data associated with an instance of the application page element; and
validate the parent container according to the validation statuses of the individual application page elements included in the parent container.

9. The method of claim 8, wherein the received validation configuration for the application page element further includes a specification of an error message to be displayed.

10. The method of claim 8, wherein the received validation configuration for the application page element further includes an indication of an event upon which validation is to be performed.

11. The method of claim 8, wherein the parent container includes a fragment of a container.

12. The method of claim 8, further comprising generating code to be executed at the runtime to propagate a validation status of the application page element to one or more parent nodes in a page hierarchy.

13. The method of claim 8, wherein a behavior of an actionable element is configured to be bound at least in part to at least one of a validation status of the application page element and a validation status of the parent container.

14. A computer program product, the computer program product being embodied in a non-transitory tangible computer readable storage medium and comprising computer instructions for:
   receiving, via an interface and during an application design time, an indication to configure validation for an application page element;
   in response to the indication, causing to be displayed a validation configuration user interface to receive validation configuration for the application page element;
   receiving, via the displayed validation configuration user interface, user input defining a validation expression that specifies a validation condition on the application page element; and
   receiving, during the application design time, an indication to group the application page element, along with at least one other application page element, into a parent container;
   receiving validation configuration for the parent container, wherein the validation configuration includes a validation expression that specifies a validation condition on the parent container, and wherein the validation condition is based at least in part on a combination of validation statuses of the individual application page elements grouped into the parent container; and
   generating, based at least in part on the validation expressions associated with the application page element and the parent container, code to be executed at a runtime to:
      validate runtime data associated with an instance of the application page element; and
   validate the parent container according to the validation statuses of the individual application page elements included in the parent container.

* * * * *